US010158501B2

(12) United States Patent
Kouno

(10) Patent No.: US 10,158,501 B2
(45) Date of Patent: Dec. 18, 2018

(54) COMMUNICATION SYSTEM, MANAGEMENT SERVER, AND RECORDING MEDIUM

(71) Applicant: KONICA MINOLTA, INC., Chiyoda-ku, Tokyo (JP)

(72) Inventor: Takahiro Kouno, Kawanishi (JP)

(73) Assignee: KONICA MINOLTA, INC., Tokyo (JP)

( * ) Notice: Subject to any disclaimer, the term of this patent is extended or adjusted under 35 U.S.C. 154(b) by 183 days.

(21) Appl. No.: 15/192,964

(22) Filed: Jun. 24, 2016

(65) Prior Publication Data

US 2017/0005829 A1 Jan. 5, 2017

(30) Foreign Application Priority Data

Jul. 1, 2015 (JP) ................................. 2015-132927

(51) Int. Cl.
*H04L 12/46* (2006.01)
*H04L 29/06* (2006.01)
*H04L 29/08* (2006.01)

(52) U.S. Cl.
CPC ........ *H04L 12/4633* (2013.01); *H04L 63/029* (2013.01); *H04L 63/0209* (2013.01); *H04L 63/0281* (2013.01); *H04L 67/10* (2013.01); *H04N 2201/0094* (2013.01)

(58) Field of Classification Search
CPC ....................... H04L 63/029; H04N 2201/0094
See application file for complete search history.

(56) References Cited

U.S. PATENT DOCUMENTS

| 6,654,792 B1* | 11/2003 | Verma ..................... H04L 12/66 709/208 |
| 7,290,060 B2* | 10/2007 | Kong .................. H04L 12/4641 370/352 |
| 8,078,888 B2 | 12/2011 | Kumakura |
| 9,264,563 B2* | 2/2016 | Anezaki ............. H04N 1/00891 |
| 9,811,294 B2* | 11/2017 | Ito ......................... G06F 3/1236 |

(Continued)

FOREIGN PATENT DOCUMENTS

| JP | 09289521 A | 11/1997 |
| JP | 2003016031 A | 1/2003 |

(Continued)

*Primary Examiner* — Lashonda T Jacobs
(74) *Attorney, Agent, or Firm* — Holtz, Holtz & Volek PC

(57) ABSTRACT

A management server receives a plurality of communication requests including a first communication request and a second communication request and controls the order of execution of a plurality of tunnel connection requests which are based on the plurality of communication requests. The first communication request is a communication request which is a request for communication with data transfer from the side of the at least one device toward the side of at least one application. The second communication request is a communication request which is a request for communication with data transfer from the side of the at least one application toward the side of the at least one device. The management server performs a first tunnel connection request which is based on the first communication request, in preference to a second tunnel connection request which is based on the second communication request.

21 Claims, 27 Drawing Sheets

(56) References Cited

U.S. PATENT DOCUMENTS

| | | | |
|---|---|---|---|
| 9,866,407 B2* | 1/2018 | Matsuhara | H04L 12/4633 |
| 2002/0080391 A1* | 6/2002 | Sugiura | G06F 3/1204 |
| | | | 358/1.15 |
| 2009/0248842 A1* | 10/2009 | Hashimoto | H04L 41/0893 |
| | | | 709/221 |
| 2011/0191464 A1* | 8/2011 | Okabe | G06F 15/16 |
| | | | 709/224 |
| 2011/0276986 A1* | 11/2011 | Kamath | G06F 3/1203 |
| | | | 719/328 |
| 2012/0054851 A1* | 3/2012 | Piazza | H04L 63/0209 |
| | | | 726/12 |
| 2012/0092695 A1* | 4/2012 | Masuyama | G06F 3/121 |
| | | | 358/1.14 |
| 2012/0293837 A1* | 11/2012 | Mori | H04N 1/00244 |
| | | | 358/1.15 |
| 2013/0003088 A1* | 1/2013 | Feng | G06F 3/1204 |
| | | | 358/1.9 |
| 2013/0021640 A1* | 1/2013 | Tamura | H04N 1/00217 |
| | | | 358/1.14 |
| 2013/0135675 A1* | 5/2013 | Hashimoto | H04N 1/0097 |
| | | | 358/1.15 |
| 2014/0201263 A1* | 7/2014 | Ohashi | H04L 29/06047 |
| | | | 709/203 |
| 2014/0208132 A1* | 7/2014 | Cheston | G06F 1/26 |
| | | | 713/310 |
| 2014/0268236 A1* | 9/2014 | Ohara | G06F 3/1224 |
| | | | 358/1.15 |
| 2014/0324949 A1 | 10/2014 | Satomi et al. | |
| 2015/0153980 A1* | 6/2015 | Ito | G06F 3/1236 |
| | | | 358/1.14 |
| 2015/0172493 A1* | 6/2015 | Anezaki | H04N 1/00891 |
| | | | 358/1.13 |

FOREIGN PATENT DOCUMENTS

| | | |
|---|---|---|
| JP | 2009065408 A | 3/2009 |
| JP | 2013073578 A | 4/2013 |
| JP | 2013179678 A | 9/2013 |
| JP | 2014215846 A | 11/2014 |

* cited by examiner

Fig.8

| DEVICE TRIGGER COMMUNICATION REQUEST (REQUESTER = DEVICE) | APPLICATION TRIGGER COMMUNICATION REQUEST (REQUESTER = APPLICATION) |
|---|---|
| +100 | ±0 |

| COMMUNICATION REQUEST ON USER INSTRUCTION PROCESSING | COMMUNICATION REQUEST ON MANAGEMENT PROCESSING |
|---|---|
| +10 | ±0 |

Fig.9

| C11 (CLOUD SCAN AND THE LIKE) | DEVICE TRIGGER +100 | TOTAL 110 |
| --- | --- | --- |
| | USER INSTRUCTION PROCESSING +10 | |

| C12 (RESULT NOTIFICATION AND THE LIKE) | DEVICE TRIGGER +100 | TOTAL 100 |
| --- | --- | --- |
| | MANAGEMENT PROCESSING ±0 | |

| C21 (CLOUD PRINT AND THE LIKE) | APPLICATION TRIGGER ±0 | TOTAL 10 |
| --- | --- | --- |
| | USER INSTRUCTION PROCESSING +10 | |

| C22 (APPARATUS STATE ACQUISITION AND THE LIKE) | APPLICATION TRIGGER ±0 | TOTAL 0 |
| --- | --- | --- |
| | MANAGEMENT PROCESSING ±0 | |

Fig.15

| | | | |
|---|---|---|---|
| 201 | C11 | CLOUD SCAN 301 (10a→30a→80b) | 110 |
| 204 | C11 | CLOUD SCAN 304 (10a→30a→80b) | 110 |
| 205 | C12 | RESULT NOTIFICATION 305 (10a→30a→80d) | 100 |
| 203 | C21 | CLOUD PRINT 303 (80a→30a→10a) | 10 |
| 202 | C22 | APPARATUS STATE ACQUISITION 302 (80c→30a→10a) | 0 |

Fig.18

| C11 (CLOUD SCAN AND THE LIKE) | DEVICE TRIGGER +100 | TOTAL 110 |
|---|---|---|
| | USER INSTRUCTION PROCESSING +10 | |
| | LOAD ADJUSTMENT POINT ±0 | |

| C11 (CLOUD SCAN AND THE LIKE) | DEVICE TRIGGER +100 | TOTAL 107 |
|---|---|---|
| | USER INSTRUCTION PROCESSING +10 | |
| | LOAD ADJUSTMENT POINT −3 | |

| C21 (CLOUD PRINT AND THE LIKE) | APPLICATION TRIGGER +0 | TOTAL 10 |
|---|---|---|
| | USER INSTRUCTION PROCESSING +10 | |
| | LOAD ADJUSTMENT POINT ±0 | |

| C21 (CLOUD PRINT AND THE LIKE) | APPLICATION TRIGGER +0 | TOTAL 8 |
|---|---|---|
| | USER INSTRUCTION PROCESSING +10 | |
| | LOAD ADJUSTMENT POINT −2 | |

Fig.19

| C12 (RESULT NOTIFICATION AND THE LIKE) | DEVICE TRIGGER +100 | TOTAL 100 |
| --- | --- | --- |
| | MANAGEMENT PROCESSING ±0 | |
| | LOAD ADJUSTMENT POINT ±0 | |

| C12 (RESULT NOTIFICATION AND THE LIKE) | DEVICE TRIGGER +100 | TOTAL 98 |
| --- | --- | --- |
| | MANAGEMENT PROCESSING ±0 | |
| | LOAD ADJUSTMENT POINT −2 | |

| C22 (APPARATUS STATE ACQUISITION AND THE LIKE) | APPLICATION TRIGGER ±0 | TOTAL 0 |
| --- | --- | --- |
| | MANAGEMENT PROCESSING ±0 | |
| | LOAD ADJUSTMENT POINT ±0 | |

| C22 (APPARATUS STATE ACQUISITION AND THE LIKE) | APPLICATION TRIGGER ±0 | TOTAL −2 |
| --- | --- | --- |
| | MANAGEMENT PROCESSING ±0 | |
| | LOAD ADJUSTMENT POINT −2 | |

| | | | | | |
|---|---|---|---|---|---|
| 201 | C11 | CLOUD SCAN 301 (10a→30a→80b) | 110 | (−3) | 107 |
| 204 | C11 | CLOUD SCAN 304 (10a→30a→80b) | 110 | (−3) | 107 |
| 205 | C12 | RESULT NOTIFICATION 305 (10a→30a→80d) | 100 | (−2) | 98 |
| 203 | C21 | CLOUD PRINT 303 (80a→30a→10a) | 10 | (−2) | 8 |
| 202 | C22 | APPARATUS STATE ACQUISITION 302 (80c→30a→10a) | 0 | (−2) | −2 |
| 206 | C11 | CLOUD SCAN 306 (10b→30a→80b) | 110 | (−2) | 108 |

| | | | | | |
|---|---|---|---|---|---|
| 206 | C11 | CLOUD SCAN 306 (10b→30a→80b) | 110 | (−2) | 108 |
| 201 | C11 | CLOUD SCAN 301 (10a→30a→80b) | 110 | (−3) | 107 |
| 204 | C11 | CLOUD SCAN 304 (10a→30a→80b) | 110 | (−3) | 107 |
| 205 | C12 | RESULT NOTIFICATION 305 (10a→30a→80d) | 100 | (−2) | 98 |
| 203 | C21 | CLOUD PRINT 303 (80a→30a→10a) | 10 | (−2) | 8 |
| 202 | C22 | APPARATUS STATE ACQUISITION 302 (80c→30a→10a) | 0 | (−2) | −2 |
| 207 | C21 | CLOUD PRINT 307 (80a→30a→10b) | 10 | (−1) | 9 |

| | | | | | |
|---|---|---|---|---|---|
| 206 | C11 | CLOUD SCAN 306 (10b→30a→80b) | 110 | (-2) | 108 |
| 201 | C11 | CLOUD SCAN 301 (10a→30a→80b) | 110 | (-3) | 107 |
| 204 | C11 | CLOUD SCAN 304 (10a→30a→80b) | 110 | (-3) | 107 |
| 205 | C12 | RESULT NOTIFICATION 305 (10a→30a→80d) | 100 | (-2) | 98 |
| 208 | C21 | CLOUD PRINT 308 (80a→30a→10a) | 10 | (-0) | 10 |
| 207 | C21 | CLOUD PRINT 307 (80a→30a→10b) | 10 | (-1) | 9 |
| 203 | C21 | CLOUD PRINT 303 (80a→30a→10a) | 10 | (-2) | 8 |
| 202 | C22 | APPARATUS STATE ACQUISITION 302 (80c→30a→10a) | 0 | (-2) | -2 |
| 209 | C11 | CLOUD SCAN 309 (10a→30a→80e) | 110 | (-2) | 108 |

Fig.25

| | | | | | |
|---|---|---|---|---|---|
| 206 | C11 | CLOUD SCAN 306 (10b→30a→80b) | 110 | (-2) | 108 |
| 209 | C11 | CLOUD SCAN 309 (10a→30a→80e) | 110 | (-2) | 108 |
| 201 | C11 | CLOUD SCAN 301 (10a→30a→80b) | 110 | (-3) | 107 |
| 204 | C11 | CLOUD SCAN 304 (10a→30a→80b) | 110 | (-3) | 107 |
| 205 | C12 | RESULT NOTIFICATION 305 (10a→30a→80d) | 100 | (-2) | 98 |
| 208 | C21 | CLOUD PRINT 308 (80a→30b→10a) | 10 | (-0) | 10 |
| 207 | C21 | CLOUD PRINT 307 (80a→30a→10b) | 10 | (-1) | 9 |
| 203 | C21 | CLOUD PRINT 303 (80a→30a→10a) | 10 | (-2) | 8 |
| 202 | C22 | APPARATUS STATE ACQUISITION 302 (80c→30a→10a) | 0 | (-2) | -2 |

COMMUNICATION SYSTEM, MANAGEMENT SERVER, AND RECORDING MEDIUM

This application is based on Japanese Patent Application No. 2015-132927 filed on Jul. 1, 2015, the contents of which are hereby incorporated by reference.

BACKGROUND OF THE INVENTION

Field of the Invention

The present invention relates to a communication system which performs communication between cloud servers outside a fire wall and devices inside the fire wall, and its relevant technique.

Description of the Background Art

There is a technique for ensuring cooperation between servers (cloud servers or the like) outside a LAN and devices (an image forming apparatus and the like) inside the LAN.

There is, for example, a technique for printing out an electronic document stored in a server on a cloud (a cloud server) by using an image forming apparatus on a local side (inside a LAN) (see Japanese Patent Application Laid Open Gazette No. 2013-73578 (Patent Document 1)).

In Patent Document 1, disclosed is a document output system (communication system) which comprises an image forming apparatus (device), a gateway, and a cloud server. In the system, an electronic document stored in the cloud server is sent to the image forming apparatus via the gateway and the like and printed out in the image forming apparatus 10. Further, the gateway and the image forming apparatus (device) are provided inside a LAN and the cloud server is provided outside the LAN.

In such a system as above, usually, a fire wall is provided between the image forming apparatus (device) inside the LAN and the cloud server outside the LAN.

Access from the image forming apparatus inside the LAN to the cloud server outside the LAN passes through the fire wall and is allowed.

Reverse access, i.e., direct access from the cloud server outside the LAN to the image forming apparatus inside the LAN, however, is blocked by the fire wall. In other words, the cloud server cannot directly access the image forming apparatus.

In contrast to this, there is a possible technique in which a message session (communication session) (as an exception to a fire wall) is established between a management server outside a LAN and a gateway (communication relay apparatus) inside the LAN and then access is made from the cloud server outside the LAN to the image forming apparatus inside the LAN via the management server and the gateway.

FIGS. 26 and 27 show such a technique as above. At the start-up or the like, a gateway 30 (30a) establishes a message session 511 with a management server 50 which is specified in advance (see a thick line in FIG. 26). After that, when a cloud server 70 (via the management server 50) issues an access request for a specific device 10a, by using the message session 511 between the management server 50 and the gateway 30 (30a), the management server 50 sends a tunnel connection request to the gateway 30a. The tunnel connection request is a command requesting the gateway 30 to establish a tunnel connection (a tunnel connection between the gateway 30 and the cloud server 70). In other words, the tunnel connection request is a command ordering the gateway 30 to perform communication using the tunnel connection. On the basis of the tunnel connection request, the gateway 30a establishes a tunnel communication with the cloud server 70 (see FIG. 27). Then, by using the tunnel communication, the cloud server 70 makes access to the device (image forming apparatus) 10a (via the gateway 30). This technique will be described later in detail.

Further, the similar technique is disclosed in Japanese Patent Application Laid Open Gazette No. 2014-215846 (Patent Document 2).

In such a technique, the management server 50 manages the gateways.

The reverse access, which is opposite in direction to that in the technique of the above-described Patent Document 2, i.e., the access from the cloud server outside the LAN to the image forming apparatus inside the LAN does not necessarily need to pass through the fire wall. It is preferable, however, from the security problem (described later) and the like that even for the access from the cloud server outside the LAN to the image forming apparatus inside the LAN, the communication should be performed via the management server 50.

Further, if the communication from the device inside the fire wall to the server outside the fire wall is performed not via the management server 50, there may occur a system control problem such as a plurality of communications performed in disorder or the like.

In order to solve these problems, it is preferable that the communication between the cloud server outside the fire wall and the device inside the fire wall should be performed via the management server 50.

There is a possible case, for example, where the management server 50 receives a communication request from each cloud server and a communication request from each device and performs processings (a tunnel connection request for the gateway, and the like) on the basis of the communication requests in accordance with the order of receiving the communication requests.

When the processings on the basis of the communication requests are performed only in accordance with the order of receiving the communication requests, however, there are many cases where the processings on the basis of the communication requests are disadvantageously performed in an inefficient order of execution.

SUMMARY OF THE INVENTION

It is an object of the present invention to provide a communication system capable of efficiently performing processings on the basis of a plurality of communication requests and its relevant technique.

The present invention is intended for a communication system. According to a first aspect of the present invention, the communication system includes at least one device provided inside a fire wall, at least one cloud server provided outside the fire wall, at least one gateway for relaying communication between the at least one device and at least one application performed by the at least one cloud server, and a management server for managing communication between the at least one device and the at least one application via the at least one gateway, and in the communication system of the present invention, the management server has a receiving part for receiving a plurality of communication requests including a first communication request and a second communication request, the first communication request being a communication request from any one of the at least one device, which is a request for communication with data transfer from the side of the at least one device toward the side of the at least one application, the second communication request being a communication request from any one of the at least one application, which is a request for communication with data transfer from the side of the at least one application toward the side of the at least one device, and a tunnel connection request control part for controlling the order of execution of a plurality of tunnel connection requests which are based on the plurality of communication requests. Further, in the communication system of the present invention, each of the plurality of tunnel connection requests is a command requesting any one of the at least one gateway to perform communication using tunnel connection between the one of the at least one gateway and the one of the at least one application, and the tunnel connection request control part performs a first tunnel connection request which is a tunnel connection request based on the first communication request in preference to a second tunnel connection request which is a tunnel connection request based on the second communication request.

The present invention is also intended for a management server which manages communication between at least one device provided inside a fire wall and at least one application performed by at least one cloud server provided outside the fire wall, the communication being relayed by at least one gateway. According to a second aspect of the present invention, the management server includes a receiving part for receiving a plurality of communication requests including a first communication request and a second communication request, the first communication request being a communication request from any one of the at least one device, which is a request for communication with data transfer from the side of the at least one device toward the side of the at least one application, the second communication request being a communication request from any one of the at least one application, which is a request for communication with data transfer from the side of the at least one application toward the side of the at least one device, and a tunnel connection request control part for controlling the order of execution of a plurality of tunnel connection requests which are based on the plurality of communication requests, and in the management server of the present invention, each of the plurality of tunnel connection requests is a command requesting any one of the at least one gateway to perform communication using tunnel connection between the one of the at least one gateway and the one of the at least one application, and the tunnel connection request control part performs a first tunnel connection request which is a tunnel connection request based on the first communication request in preference to a second tunnel connection request which is a tunnel connection request based on the second communication request.

The present invention is still also intended for a non-transitory computer-readable recording medium. According to a third aspect of the present invention, the non-transitory computer-readable recording medium records therein a computer program to be executed by a computer embedded in a management server for managing communication between at least one device provided inside a fire wall and at least one application performed by at least one cloud server provided outside the fire wall, the communication being relayed by at least one gateway, to cause the computer to perform the steps of: a) receiving a plurality of communication requests including a first communication request and a second communication request, the first communication request being a communication request from any one of the at least one device, which is a request for communication with data transfer from the side of the at least one device toward the side of the at least one application, the second communication request being a communication request from any one of the at least one application, which is a request for communication with data transfer from the side of the at least one application toward the side of the at least one device; and b) controlling the order of execution of a plurality of tunnel connection requests which are based on the plurality of communication requests, and in the non-transitory computer-readable recording medium of the present invention, each of the plurality of tunnel connection requests is a command requesting any one of the at least one gateway to perform communication using tunnel connection between the one of the at least one gateway and the one of the at least one application, and a first tunnel connection request which is a tunnel connection request based on the first communication request is performed in preference to a second tunnel connection request which is a tunnel connection request based on the second communication request in the step b).

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a view showing a given point in accordance with the classification;

FIG. 9 is a view showing an exemplary case where an evaluation value (priority value) is given for each of the tunnel connection requests;

FIGS. 12 to 15 are conceptual diagrams each showing a state in a queue of the management server;

FIGS. 18 and 19 are views each showing an exemplary case where an evaluation value (priority value) is given for each of the tunnel connection requests;

FIGS. 21 to 25 are conceptual diagrams each showing a state in a queue of the management server.

DESCRIPTION OF THE PREFERRED EMBODIMENTS

Hereinafter, the preferred embodiments of the present invention will be described with reference to the accompanying drawings.

1. The First Preferred Embodiment

1-1. Overall Constitution of System

Figure 1:
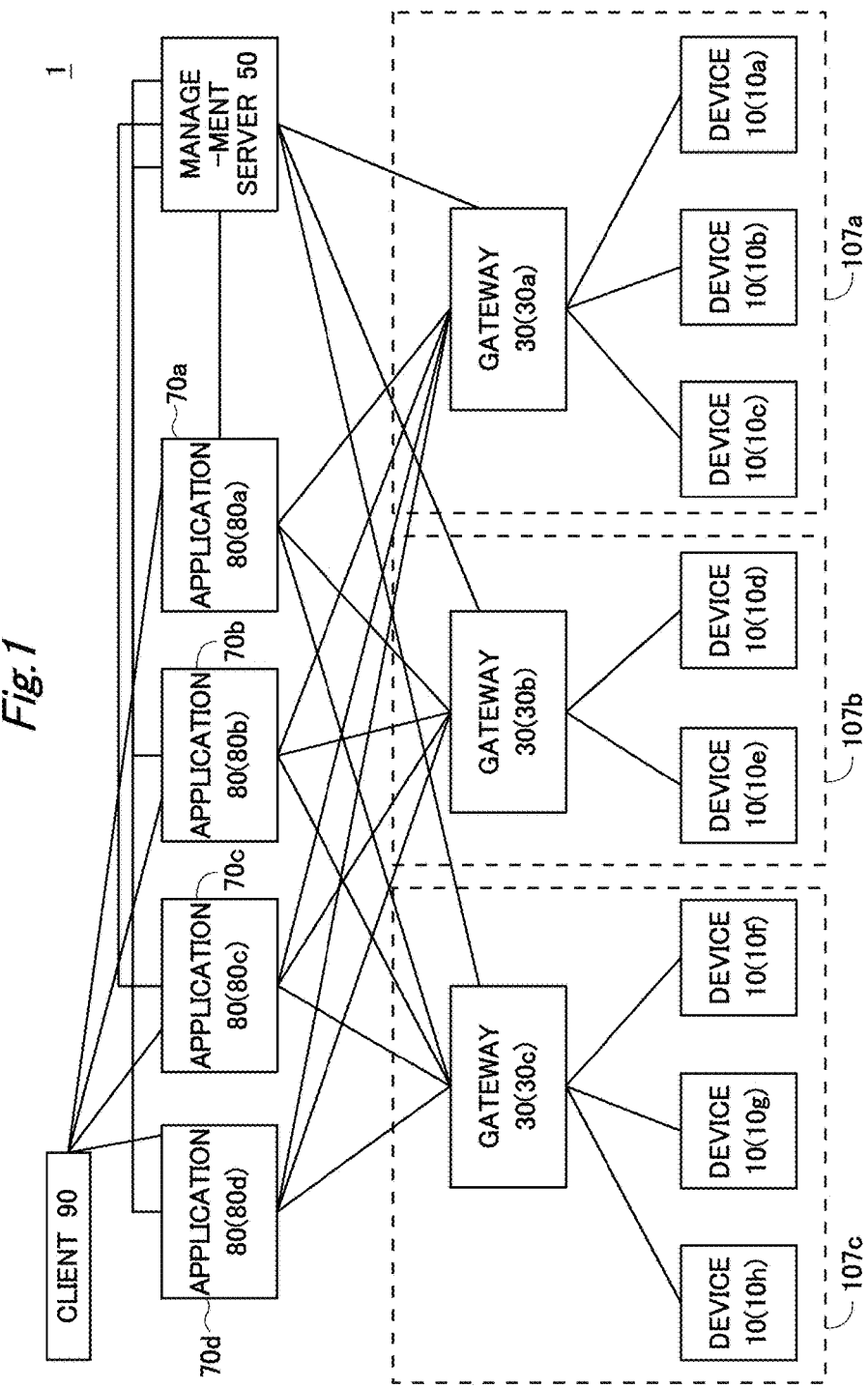
FIG. 1 is a view showing a schematic configuration of a communication system in accordance with a first preferred embodiment.
Figure 2:
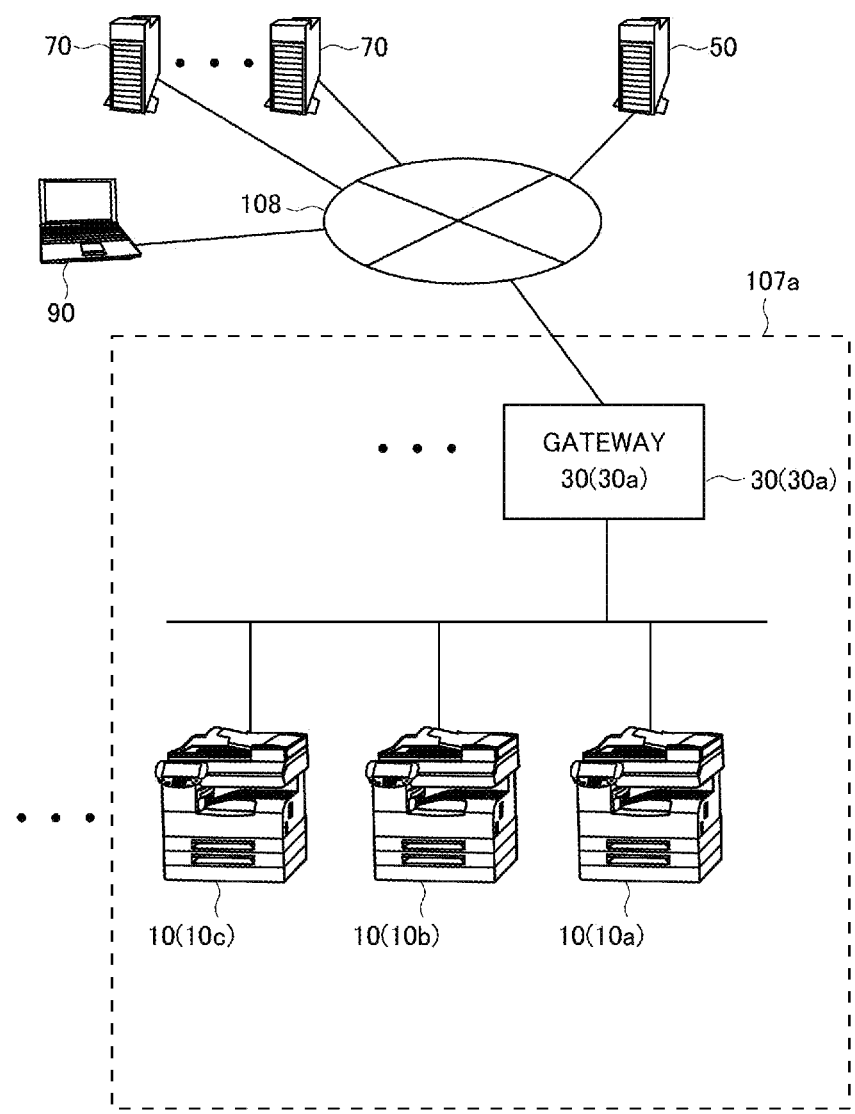
FIG. 2 is a view showing part of FIG. 1.

FIGS. 1 and 2 are views each showing a schematic configuration of a communication system 1 in accordance with the preferred embodiments of the present invention. Further, FIG. 2 is a view showing part of FIG. 1.

As shown in FIG. 1 and the like, the communication system 1 comprises a plurality of devices 10 (10a, 10b, 10c, . . . ), a plurality of gateways 30 (30a, 30b, 30c), and a management server computer (hereinafter, also referred to simply as a "management server") 50. The communication system 1 further comprises a plurality of cloud server computers (hereinafter, also referred to simply as "cloud servers") 70, and a plurality of client computers (hereinafter, also referred to simply as "clients") 90.

The constituent elements 10, 30, 50, 70, and 90 are connected with one another through a network 108 (see FIG. 2), and capable of performing network communication with one another. Further, the network 108 includes a LAN (Local Area Network) 107, the internet, and the like. The connection between each of the constituent elements and the network 108 may be a wired connection or a wireless connection.

Each of the gateways 30 and one or two or more devices 10 corresponding to the gateway 30 are provided inside each of the LANs 107, which is constructed in a company or the like, (in other words, inside a fire wall). To each gateway 30, connected are the devices 10 provided inside the same LAN 107. More in detail, as shown in FIG. 1, for example, one gateway 30a and three devices 10 (10a, 10b, 10c) are provided inside a LAN 107a constructed in a company, and one gateway 30b and two devices 10 (10d, 10e) are provided inside a LAN 107b constructed in another company. Further, inside each LAN 107, a single gateway 30 may be provided, or two or more gateways 30 may be provided.

On the other hand, the management server 50, the cloud servers 70, and the clients 90 are provided outside the LAN 107 (in other words, outside the fire wall). Further, the client 90 may be provided inside the LAN 107.

Herein, as an example of the device 10, shown is a Multi-Functional Peripheral (also abbreviated as an "MFP"). The MFP is also referred to as an image forming apparatus, a communication apparatus, or the like.

On the other hand, the gateways 30, the management server 50, the cloud servers 70, and the clients 90 are each constructed by using a server computer, a personal computer, or the like.

In this communication system 1, performed is a processing on the basis of a communication request from the cloud server 70 (in detail, an application software program (hereinafter, also referred to simply as an "application") 80 installed on the cloud server 70). The communication request from the application 80 is issued from the application 80 (triggered by the application side) and is also referred to as an "application trigger communication request". In the "application trigger communication request", a processing with data transfer in a direction from the upper side of FIG. 1 (the side of the cloud server 70) toward the lower side (the side of the device 10) (also expressed as "downward"). For example, a print instruction sent from the client 90 to the cloud server 70 is transmitted to the device 10 via the management server 50 and the gateway 30 and then a printing operation is performed in the device (MFP) 10. Such a printout is also referred to as a "cloud print" or the like since this is a processing performed via the cloud server. The communication request in the "cloud print" is an example of the "application trigger communication request".

Further, in this communication system 1, conversely, a processing on the basis of a communication request from the device 10 (via the gateway) is also performed. The communication request from the device 10 is issued from the device 10 (triggered by the device side) and is also referred to as a "device trigger communication request". In the "device trigger communication request", a processing in a direction opposite to the above-described "downward" processing, i.e., a processing with data transfer in a direction from the lower side of FIG. 1 (the side of the device 10) toward the upper side (the side of the cloud server 70) (also expressed as "upward"). For example, a scan image generated in the device 10 is sent to the cloud server 70 from the device 10 via the gateway 30 under the control of the management server 50 and stored into the cloud server 70. Such a scan processing is also referred to as a "cloud scan" or the like since this is accompanied by the storage processing into the cloud server. The communication request in the "cloud scan" is an example of the "device trigger communication request".

On each of the cloud servers 70, one or a plurality of applications 80 are installed. Each application 80 is provided in a SaaS (Software as a Service) form. In other words, a function of each application 80 is provided as a service. For example, an application 80a for cloud print is installed on the cloud server 70a and a cloud print service is provided by using the application 80a, the device 10, and the like. Further, an application 80b for cloud scan is installed on the cloud server 70b and a cloud scan service is provided by using the application 80b, the device 10, and the like.

Furthermore, each gateway 30 has a function of relaying communication between each of the plurality of devices 10 and the plurality of cloud servers 70 (in detail, the plurality of applications 80) corresponding to the gateway 30. Each gateway 30 is also referred to as a "communication relay apparatus".

The management server 50 is an apparatus for managing communication between the plurality of devices 10 and the plurality of cloud servers 70 (in detail, the plurality of applications 80), in particular, communication via each gateway 30 (tunnel connection communication), and the like.

The management server 50 receives an access request (communication request) for a specific device 10 among the plurality of devices 10 from the cloud server 70 and sends a tunnel connection request with the cloud server 70 to one of the plurality of gateways 30 corresponding to the specific device 10 in response to the access request. Further, the management server 50 receives an access request (communication request) for a specific cloud server 70 among the plurality of cloud servers 70 (applications 80) from the device 10 and sends a tunnel connection request with the cloud server 70 to one of the plurality of gateways 30 in response to the access request.

Herein, each tunnel connection request is a command requesting any one of the plurality of gateways 30 to perform communication between the gateway 30 and any one of the plurality of cloud servers 70 (the plurality of applications 80) by using a tunnel connection.

Further, as described later, the management server 50 receives a plurality of communication requests from the device 10 or the cloud server 70 (the application 80) and controls the order of execution of the plurality of tunnel connection requests on the basis of the plurality of communication requests.

When the management server 50 receives each communication request, the management server 50 puts the tunnel connection request corresponding to the communication request into a queue. When the tunnel connection request is put into the queue, however, an index value (priority value) V indicating the degree of priority of the tunnel connection request is assigned to the tunnel connection request. Then, the tunnel connection request is arranged at a position (one of positions different in the order (in the waiting time (queuing time)) in accordance with the index value V of the tunnel connection request in the queue. Each tunnel connection request which is arranged at a position in accordance with the index value V and stored in the queue waits for its own turn of execution. Then, the tunnel connection request whose turn of execution has come is performed. Thus, the management server 50 performs the plurality of tunnel connection requests in the order in accordance with the degree of priority. The detail or the like of the priority processing will be described later.

1-2. Overall Constitution of MFP

As mentioned above, in the first preferred embodiment, as an example of the device 10, shown is a Multi-Functional Peripheral (also abbreviated as an "MFP").

Figure 3:
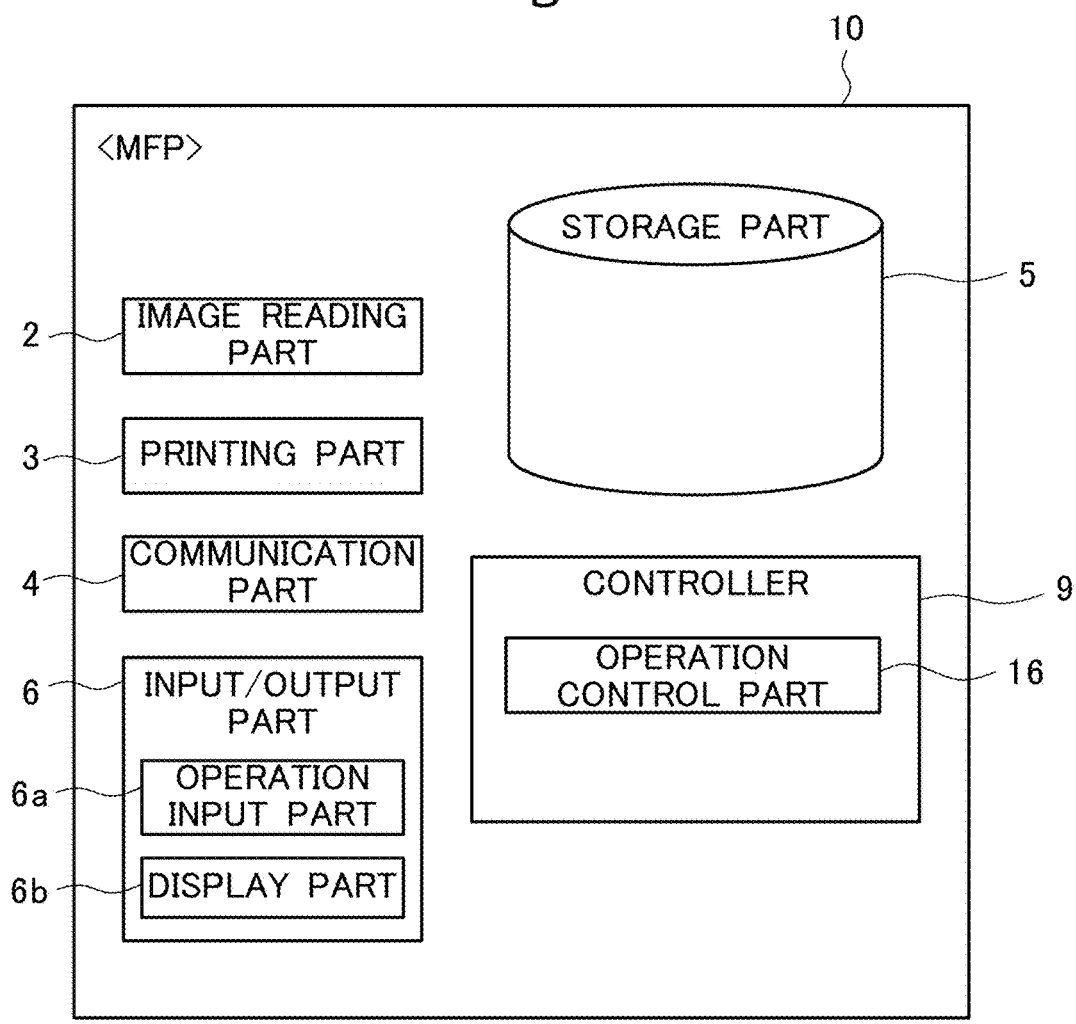
FIG. 3 is a schematic diagram showing a constitution of an MFP.

FIG. 3 is a schematic diagram showing a constitution of the MFP. The MFP is an apparatus (also referred to as a multifunction machine) having a scanner function, a printing function, a copy function, a data communication function, and the like.

The MFP is an image forming apparatus which is capable of performing a printing operation, an image reading operation (scanning operation), and the like.

As shown in FIG. 3, the MFP comprises an image reading part 2, a printing part 3, a communication part 4, a storage part 5, an input/output part 6, a controller 9, and the like and multiply uses these constituent parts to implement various functions.

The image reading part 2 is a processing part which optically reads an original manuscript placed on a predetermined position of the MFP and generates image data of the original manuscript (also referred to as an "original manuscript image").

The printing part 3 is an output part which prints out an image to various media such as paper on the basis of the image data on an object to be printed.

The communication part 4 is a processing part capable of performing facsimile communication via public networks or the like. Further, the communication part 4 is capable of performing network communication via the network 108. The network communication uses various protocols such as UDP (User Datagram Protocol), TCP (Transmission Control Protocol), IP (Internet Protocol), SNMP (Simple Network Management Protocol), FTP (File Transfer Protocol), and the like. By using the network communication, the MFP can transmit and receive various data to/from desired partners (the gateways 30, the management server 50, the cloud servers 70, and the like).

For example, the communication part 4 of the MFP is capable of performing communication with the cloud server 70 (transmitting data to the cloud server 70 and/or receiving data from the cloud server 70) via the gateway 30 by using the tunnel connection (described later) established between the gateway 30 and the cloud server 70. Further, the communication part 4 has a transmitting part for transmitting data or the like to other apparatuses and a receiving part for receiving data or the like from other apparatuses.

The storage part 5 is a storage unit such as a hard disk drive (HDD), a nonvolatile memory, or/and the like.

The input/output part 6 comprises an operation input part 6a for receiving an input which is given to the MFP and a display part 6b for displaying various information thereon. The input/output part 6 is also referred to as an operation part.

The controller 9 is a control unit for generally controlling the MFP, and comprises a CPU and various semiconductor memories (RAM, ROM, and the like).

The controller 9 causes the CPU to execute a predetermined software program (also referred to simply as a "program") stored in the ROM (e.g., EEPROM or the like), to thereby implement various processing parts (an operation control part 16 for controlling an image forming operation or the like). Further, the program may be recorded in one of various portable recording media (such as a USB memory and the like) (in other words, various non-transitory computer-readable recording media), and read out from the recording medium to be installed in the MFP. Alternatively, the program may be downloaded via the network or the like to be installed in the MFP.

1-3. Overall Constitution of Constituent Elements

Figure 4:
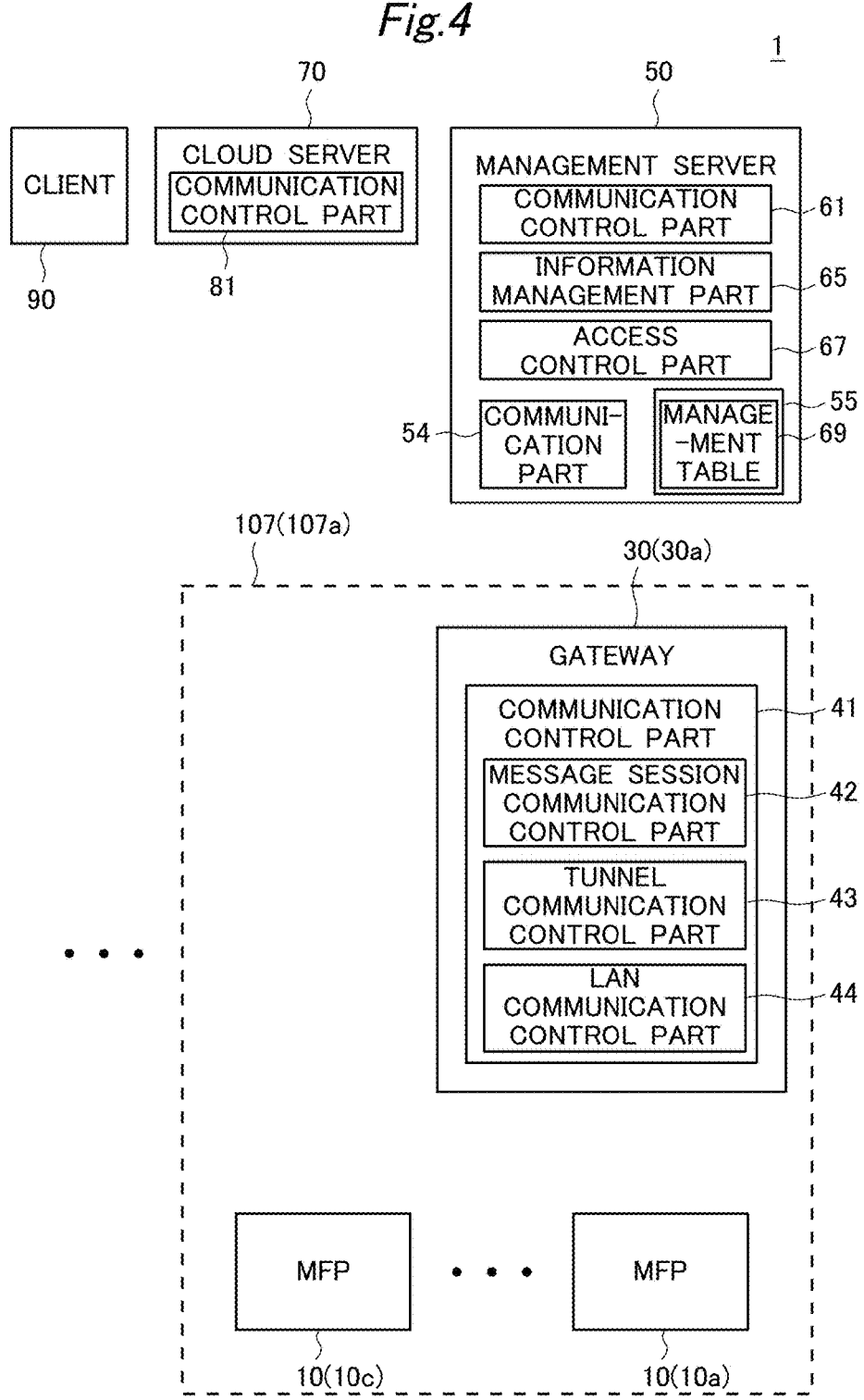
FIG. 4 is a view showing respective schematic constitutions of various apparatuses.

FIG. 4 is a view showing respective schematic constitutions of the constituent elements 30, 50, 70, and the like. With reference to FIG. 4, these constituent elements will be described. Further, in the first preferred embodiment, the gateways 30, the management server 50, the cloud servers 70, and the clients 90 are each constructed by using a server computer, a personal computer, or the like.

Cloud Server 70

The cloud server 70 comprises a communication control part 81. The communication control part 81 performs communication with the management server 50. Further, the communication control part 81 performs communication with each of the gateways 30 by using the tunnel communication (described later).

Furthermore, as mentioned above, on each of the cloud servers 70, one or a plurality of applications 80 are installed. Each application 80 performs communication with other apparatuses 50, 30, 10 (in detail, with the applications thereof), and the like through the communication control part 81.

Gateway 30

The gateway 30 relays communication between the device 10 under the control thereof and the plurality of cloud servers 70 (applications 80).

Each gateway 30 comprises various processing parts such as the communication control part 41 and the like. The controller 9 of the gateway 30 (MFP) executes a predetermined program, to thereby implement these processing parts.

The communication control part 41 is a processing part for controlling communication with other apparatuses. The communication control part 41 has a message session communication control part 42, a tunnel communication control part 43, and a LAN communication control part 44.

The LAN communication control part 44 is a processing part for performing communication with various apparatuses inside the LAN.

On the other hand, the message session communication control part 42 and the tunnel communication control part 43 are processing parts for performing communication with various apparatuses outside the LAN.

The message session communication control part 42 is a processing part for performing communication with the management server 50 by using the message session. The message session communication control part 42 establishes the message session (for example, a message session using XMPP (eXtensible Messaging and Presence Protocol) or the like) with the management server 50 and thereby performs the communication with the management server 50. The message session communication control part 42 is also referred to as a management server communication part.

The tunnel communication control part 43 is a processing part for performing communication with the cloud server 70 by using the tunnel communication. The tunnel communication control part 43 establishes the tunnel communication (for example, a communication session using HTTPS (Hypertext Transfer Protocol Secure) or the like) with the cloud server 70 and thereby relays communication between the cloud server 70 and a specific device 10. The tunnel communication control part 43 is also referred to as a cloud server communication part.

As described later, by using the tunnel connection or the like, data can be transmitted from an apparatus (the cloud server 70) outside the LAN 107 to an apparatus (the gateway 30 and the device 10) inside the LAN 107 (and transmitted in the reverse direction).

Management Server 50

The management server 50 is a server which controls the devices 10, the gateways 30, and the cloud servers 70 (including the applications 80).

The management server 50 comprises various processing parts such as a communication control part 61, an information management part 65, an access control part 67, and the like.

A CPU of the management server 50 executes a predetermined software program (also referred to simply as a "program") stored in a storage part (HDD or the like), to thereby implement these processing parts. Further, the program may be recorded in one of various portable recording media (such as a DVD-ROM and the like) (in other words, various non-transitory computer-readable recording media), and read out from the recording medium to be installed in the management server 50. Alternatively, the program may be downloaded via the network 108 or the like to be installed in the management server 50.

The communication control part 61 controls various communication operations in cooperation with a communication part 54 (communication hardware). The communication control part 61 performs, for example, communication with the cloud server 70, to thereby receive the access request from the cloud server 70. Further, the communication control part 61 performs communication with the gateways 30 by using the message session or the like. The communication part 54 has a transmitting part for transmitting data or the like to other apparatuses and a receiving part for receiving data or the like from other apparatuses. The receiving part receives the plurality of communication requests (described later) and the transmitting part transmits the tunnel connection requests on the basis of the plurality of communication requests to the gateways 30.

The information management part 65 is a processing part for managing information (management gateway information) on the plurality of gateways 30 which are management targets to be managed by the management server 50, management device information (information on the devices 10 which are management targets to be managed by each gateway 30) received from each of the plurality of gateways 30, and the like. These information (the management gateway information and the management device information) are described in a management table 69 stored in a storage part (HDD (hard disk drive) or the like) 55 of the management server 50. In the management table 69, described are the management gateway information (identification information (e.g., IP address) or the like of each gateway 30), the management device information indicating a relation between each gateway 30 and the devices (management target devices) under the control of the gateway 30, and the like.

The information management part 65 also manages information on the plurality of cloud servers 70 and information on each of the plurality of applications 80 in the plurality of cloud servers 70, and the like. These information are also stored in the management table 69. Further, the information management part 65 manages the number of tunnel connections established between each of the gateways 30 and each of the cloud servers 70, and the like, in the management table 69 and the like.

The access control part 67 analyzes the content of the access request (communication request) received from the cloud server 70 and the content of the access request (communication request) received from the device 10 via the gateway 30. Specifically, a requester (the device 10 or the application 80 (the cloud server 70)) of the communication request, the kind of requested processing (a user instruction processing or a management processing) (described later), and the like are obtained as analysis results. Further, from the analysis results, the access control part 67 controls the order of execution of the plurality of communication requests and the plurality of tunnel connection requests on the plurality of communication requests on the basis of the respective degrees of priority of the plurality of communication requests. The access control part 67 is also expressed as a tunnel connection request control part or the like since the access control part 67 is a processing part for controlling the tunnel connection requests.

The communication control part 61, the communication part 54, and the like send the "tunnel connection request" (a request indicating that a tunnel connection should be established between the gateway 30 and the specified cloud server 70), to the gateway 30 (the communication relay apparatus).

When the gateway 30 (the communication relay apparatus) receives the tunnel connection request from the access control part 67 of the management server 50, the gateway 30 establishes the tunnel connection with the cloud server 70 in response to the tunnel connection request. Then, the gateway 30 relays the communication between the cloud server 70 and the connection target device 10 by using the tunnel connection.

1-4. Operation Based on Communication Request

In this communication system 1, communication is performed between the device 10 and the cloud server 70 (the application 80) beyond the fire wall by using the gateway 30 and the management server 50. Specifically, the following two kinds of operations, i.e., an operation on the "application trigger communication request" and another operation on the "device trigger communication request" (described later) are performed.

Hereinafter, first, the operation on the "application trigger communication request" will be described.

Operation on Application Trigger Communication Request ("Downward" Operation)

Figure 26:
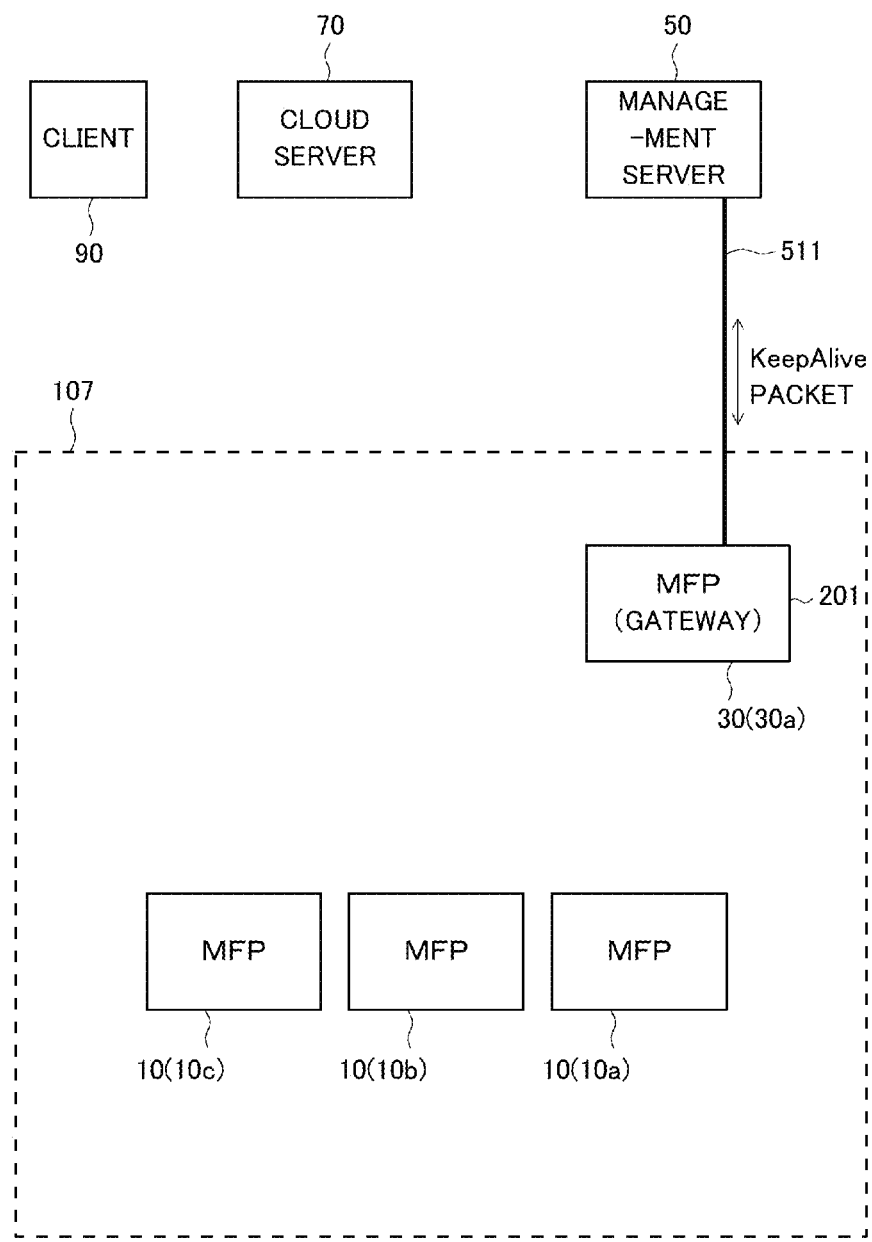
FIGS. 26 and 27 area conceptual diagrams each showing an operation of a communication system.

Also in the present preferred embodiment, performed is such an operation (the operation on the "application trigger communication request") as described above and shown in FIGS. 26 and 27. Specifically, the message session 511 (as an exception to a fire wall) (see FIG. 26) is established between the management server 50 outside the LAN and the gateway 30 (30a) inside the LAN, and then the tunnel connection request (the access request for the device 10a) is sent from the management server 50 to the gateway 30 by using the message session 511. Further, in response to the tunnel connection request, the tunnel connection is made between the gateway 30 and the cloud server 70 (see FIG. 27). Then, by using the tunnel connection, the cloud server 70 outside the LAN can access the device 10 inside the LAN via the gateway 30. For example, the "cloud print" is performed in the device 10a (image forming apparatus) by using the cloud server 70a.

Figure 5:
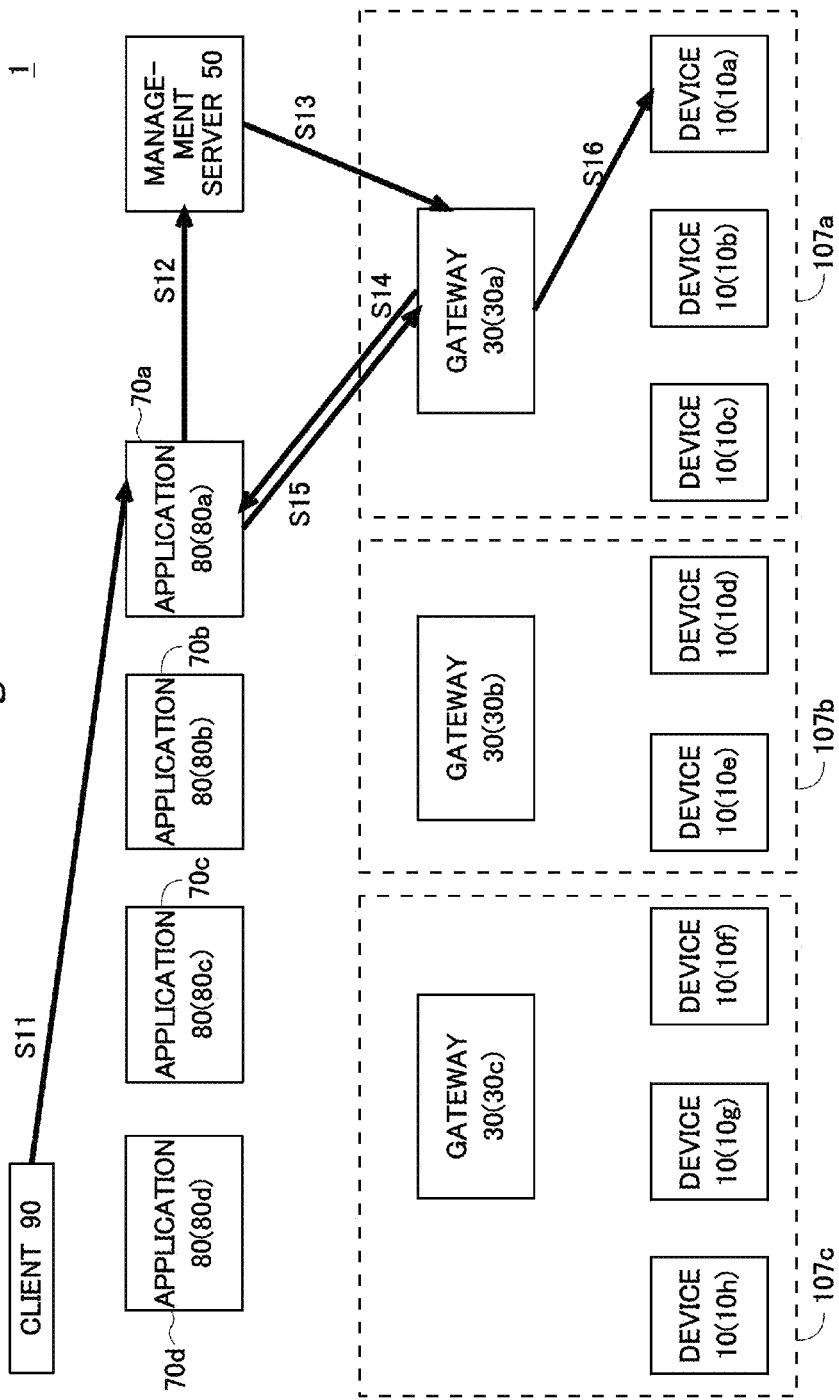
FIG. 5 is a view showing an operation on an application trigger communication request.

Hereinafter, first, such an operation will be described, with reference mainly to FIG. 5. FIG. 5 is a view showing the operation on the "application trigger communication request".

As described above (see FIG. 26), first, at the start-up or the like, the gateway 30a establishes, in advance, the communication session (in detail, message session) 511 with the management server 50 which is specified in advance. Specifically, the gateway 30a sends an establishment request of the message session to the management server 50 which is specified in advance. When the management server 50 approves the establishment request in response to this, the message session 511 is established between the gateway 30a and the management server 50 (see FIG. 26). In other words, the message session is established in response to the access from the gateway 30 inside the LAN 107 to the management server 50 outside the LAN 107. As such a message session (communication session), for example, there is a session using a communication protocol such as "XMPP:eXtensible Messaging and Presence Protocol" or the like.

Further, the gateway 30a sends information on devices (management target devices) under the control of the gateway 30a and the like to the management server 50. The management server 50 stores registration information including information on the management target devices 10 of each gateway 30 (information described in each of the device lists) into the management table 69 in the storage part 55 of the management server 50 (FIG. 4).

After that, a user operation on the "cloud print" is performed in the client 90, and the cloud server 70a (the application 80a) receives an instruction on the basis of the user operation from the client 90 (511 (FIG. 5)). In response to the instruction, the cloud server 70a (the application 80a) sends a communication request (access request) for the specific device 10a to the management server 50 (S12).

When the management server 50 receives the communication request ("application trigger communication request") from the cloud server 70 (the application 80), the management server 50 confirms that the cloud server 70 (the application 80) which is the requester has an access right for the device 10. The management server 50, for example, determines whether or not the requester has the access right on the basis of access right information which is generated and stored in the storage part 55 in advance (information listing the applications 80 having the access right for the device 10a) or the like.

When it is determined that the requesting application 80 has the access right, then, the management server 50 puts the tunnel connection request on the basis of the application trigger communication request into the queue on the tunnel connection request.

After that, when the turn of execution of the tunnel connection request which has been waiting in the queue comes, the management server 50 sends the tunnel connection request to the gateway 30 (S13 (FIG. 5)). More in detail, the management server 50 sends the tunnel connection request on the basis of the access request to the gateway 30a by using the message session (regular connection communication session) 511 between the management server 50 and the gateway 30 (30a). The "tunnel connection request" is a command requesting the gateway 30 to establish the tunnel connection with the cloud server 70 (the application 80). In other words, the tunnel connection request is a command ordering the gateway 30 to perform communication using the tunnel connection.

Figure 27:
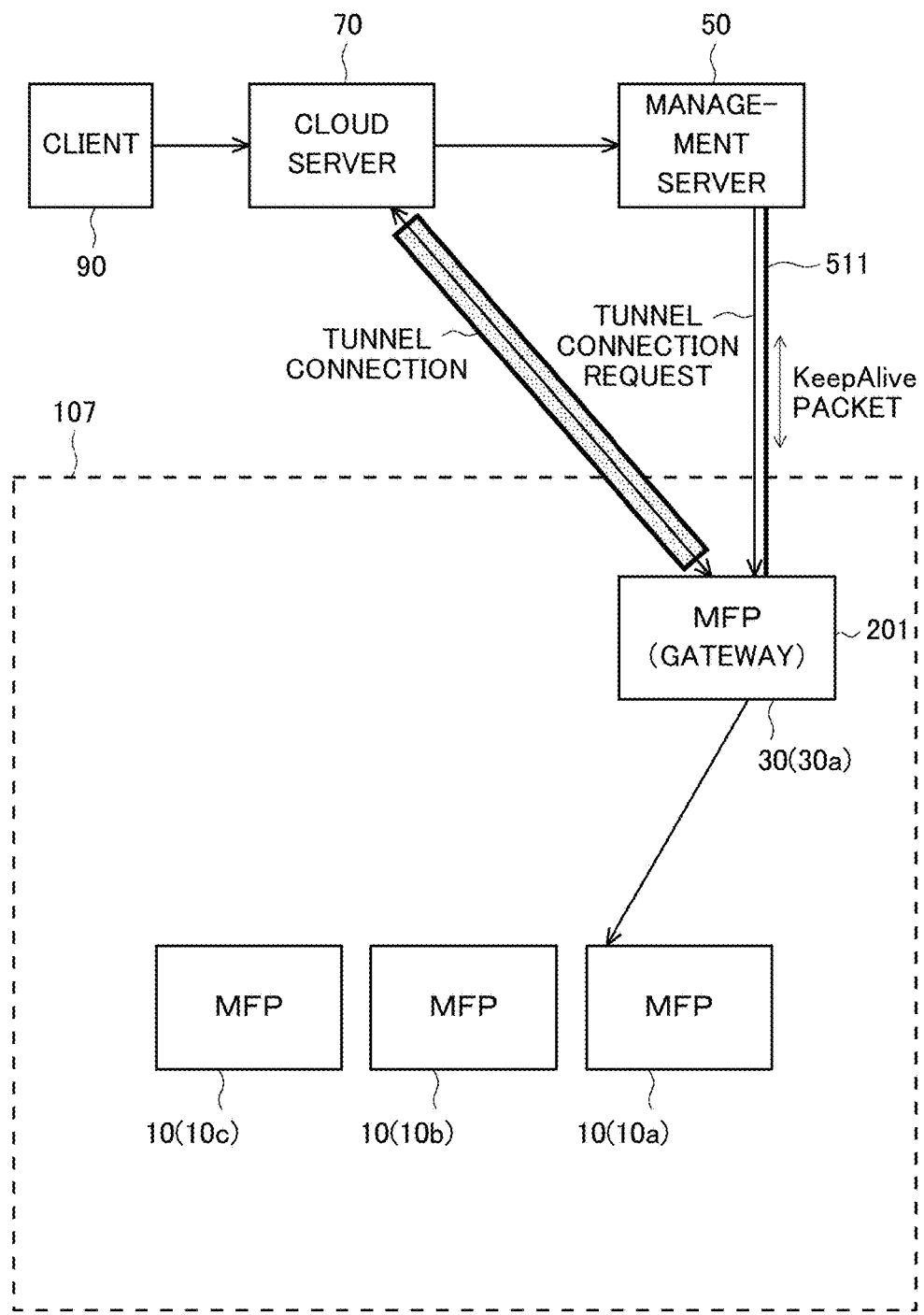

The gateway 30a which receives the tunnel connection request makes the tunnel connection (tunnel communication) with the cloud server 70a (the application 80a) in response to the tunnel connection request (S14 (FIG. 5)) (also see FIG. 27). Further, in FIG. 27, the "tunnel communication" is schematically represented by an elongated rectangle with sand hatch pattern.

More in detail, the gateway 30a sends an establishment request of an HTTP (Hypertext Transfer Protocol) session (more in detail, an HTTPS (Hypertext Transfer Protocol Secure) session) to the cloud server 70a, in response to the tunnel connection request. Such an establishment request of the HTTP (HTTPS) session is also referred to as an establishment request of the tunnel connection (by the gateway 30). Further, the "establishment request of the tunnel connection" by the gateway 30 is different from the "tunnel connection request" by the management server 50. The establishment request of the tunnel connection" by the gateway 30 is a request (command) issued from the gateway 30 to the cloud server 70, for an establishment of the actual tunnel connection, in response to the "tunnel connection request" by the management server 50.

Then, the cloud server 70a approves the "establishment request of the tunnel connection" by the gateway 30, to thereby establish the tunnel connection (tunnel communication) using the HTTP session between the gateway 30a and the cloud server 70a. In other words, the tunnel connection is established in response to the access from the gateway 30 inside the LAN 107 to the cloud server 70 outside the LAN 107.

When the tunnel connection is established, the gateway 30a relays the communication between the cloud server 70a and the device 10a (mainly "downward" data communication) by using the tunnel connection (S15 and S16). More in detail, by using the tunnel connection with the HTTP (HTTPS) session, the cloud server 70 can send various data to the device 10 (e.g., 10d) via the gateway 30.

Thus, the access from the cloud server 70 to the device (image forming apparatus) 10 (via the gateway 30) is performed by using the tunnel communication.

As described above, the management server 50 receives the communication request form the application 80 (80a), which is the request (also referred to as the "application trigger communication request") of communication with the ("downward") data transfer in a direction from the application 80 (80a) toward the device 10 (10a) (via the gateway 30). Then, the management server 50 puts the tunnel connection request on the basis of the application trigger communication request into the queue, and when the turn of execution of the tunnel connection request which has been waiting in the queue comes, the management server 50 sends the tunnel connection request to the gateway 30. After that, the gateway 30 makes the tunnel connection with the cloud server 70a (the application 80a) in response to the tunnel connection request, and relays the communication (mainly "downward" data communication) between the cloud server 70a and the device 10a by using the tunnel connection.

Operation on Device Trigger Communication
Request ("Upward" Operation)

Figure 6:
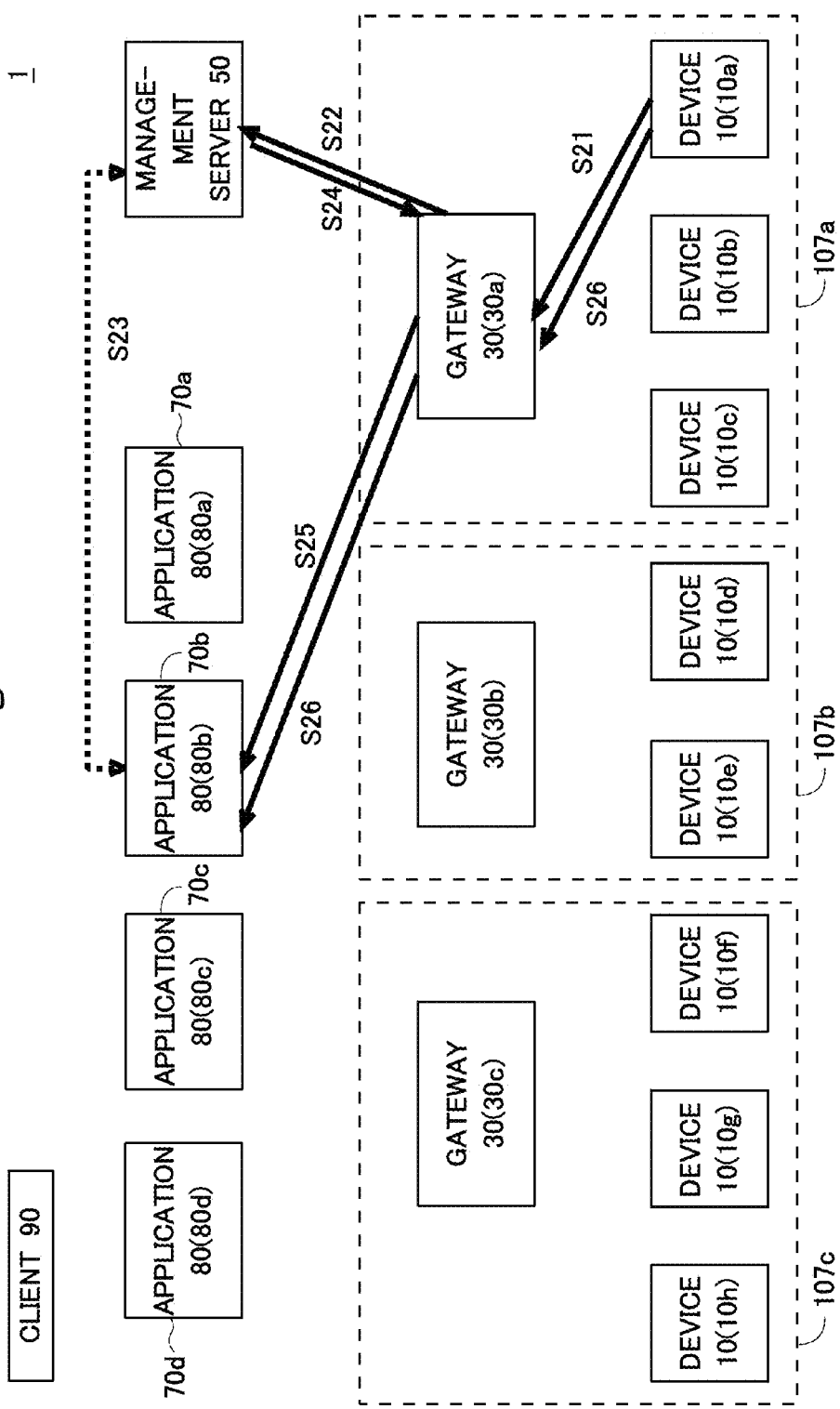
FIG. 6 is a view showing an operation on a device trigger communication request.

In this communication system 1, a "reverse" operation (an operation on the basis of the "device trigger communication request" (described later)) of the operation on the basis of the above-described "application trigger communication request" ("downward" operation) is also performed. Hereinafter, with reference to FIG. 6, the operation will be described. Further, herein, as an example of the processing with the device trigger communication request, a "cloud scan" will be shown.

Specifically, first, like in the above-described case, at the start-up or the like, the gateways 30a establishes, in advance, the communication session (message session) 511 with the management server 50 which is specified in advance.

After that, a user operation on the "cloud scan", for example, is performed in the device 10 (e.g., 10a), and the device 10 sends a communication request for the application 80 (e.g., 80b) operating in the cloud server 70 (e.g., 70b) to the management server 50 via the gateway 30 (S21 and S22). The communication request is a communication request from the device 10 (via the gateway), which is the request of communication with the ("upward") data transfer in a direction from the device 10 toward the application 80 (via the gateway 30). The communication request is issued from the device 10 (triggered by the device side) and is also referred to as a "device trigger communication request".

When the management server 50 receives the communication request ("device trigger communication request") via the gateway 30, the management server 50 confirms that the device 10 (10a) which is the requester has an access right for the cloud server 70 (the application 80). The management server 50, for example, may inquire of the application 80b which is the communication target, whether or not the requesting device 10 has the access right (S23), and determine whether or not the requester has the access right on the basis of the inquiry result. Alternatively, the management server 50 may determine whether or not the requester has the access right (without performing communication with the application 80b at this point in time) on the basis of the access right information (information listing the devices 10 having the access right for the application 80b) which is received in advance from the application 80b.

When it is determined (confirmed) that the requesting device 10 has the access right, then, the same operation as above is performed.

Specifically, the management server 50 puts the tunnel connection request on the basis of the device trigger communication request into the queue on the tunnel connection request. Further, the tunnel connection request on the basis of the device trigger communication request and the tunnel connection request on the basis of application trigger communication request are put into the same queue.

After that, when the turn of execution of the tunnel connection request which has been waiting in the queue comes, the management server 50 sends the tunnel connection request to the gateway 30 (S24). The gateway 30 makes (establishes) the tunnel connection with the cloud server 70b (the application 80b) in response to the tunnel connection request (S25). Then, the gateway 30 relays the communication between the device 10a and the cloud server 70b (mainly the "upward" data communication (an upload operation of scan image, or the like)) by using the tunnel connection (S26).

Thus, the processing with the device trigger communication request is performed.

Further, on such a device trigger communication request, it is preferable to perform the following processing for security improvement. Specifically, after the management server 50 confirms that the device 10 which is the requester of the device trigger communication request has the access right, the management server 50 receives a one-time password from the cloud server 70 (S23). Then, the management server 50 accesses the cloud server 70 by using the one-time password and makes the tunnel connection (S25). With such an operation, it is possible to improve the security of the cloud server 70 and the like.

1-5. Overview of Control Operation on A Plurality of Tunnel Connection Requests

As described above, various communication requests are sent from the applications 80 to the management server 50 (see Step S12) or from the devices 10 to the management server 50 (via the gateways 30) (see Steps S21 and S22) as occasion arises. In detail, the "application trigger communication request" is sent from the application 80 to the management server 50 as occasion arises, and the "device trigger communication request" is sent from the device 10 to the management server 50 (via the gateway 30) as occasion arises.

For processing the plurality of communication requests, there is a possible method where the management server 50 sequentially processes the plurality of communication requests (and the plurality of tunnel connection requests on the basis of the plurality of communication requests) in accordance with the order of receiving these communication requests. More in detail, the management server 50 may sequentially put the plurality of communication requests (and the plurality of tunnel connection requests or the like) into the queue in accordance with the order of reception and process the plurality of communication requests (and the plurality of tunnel connection requests or the like) which are waiting in the queue in accordance with the order of reception.

It is not always efficient, however, that these communication requests and the tunnel connection requests on the basis of the communication requests are processed only in accordance with the order of receiving the communication requests.

For example, it is now assumed that the management server 50 receives a plurality of "cloud prints" and then receives a "cloud scan". The "cloud scan" is a processing using the device (MFP) 10 inside the LAN and a general user of the cloud scan is present near the device 10 and expects a quick response. On the other hand, the "cloud print" is a processing requested mainly by a general user who is present outside the LAN (any place outside his office or the like), to perform printing with the device 10 inside the LAN. In most cases, the general user of the cloud print is not present near the device 10 and does not expect a quick response (it is all right that the printing is completed when he comes back).

In such a situation, if priority is given to the tunnel connection request or the like on the plurality of cloud prints, the tunnel connection request on the cloud scan is not performed until the tunnel connection requests on the plurality of cloud prints are completed. As a result, the general user of the cloud scan has to wait for a relatively long time though he expects a quick response.

In the case where the tunnel connection requests on the basis of the communication requests are performed only in accordance with the order of receiving the communication requests, there arises the above problem or the like.

Figure 7:
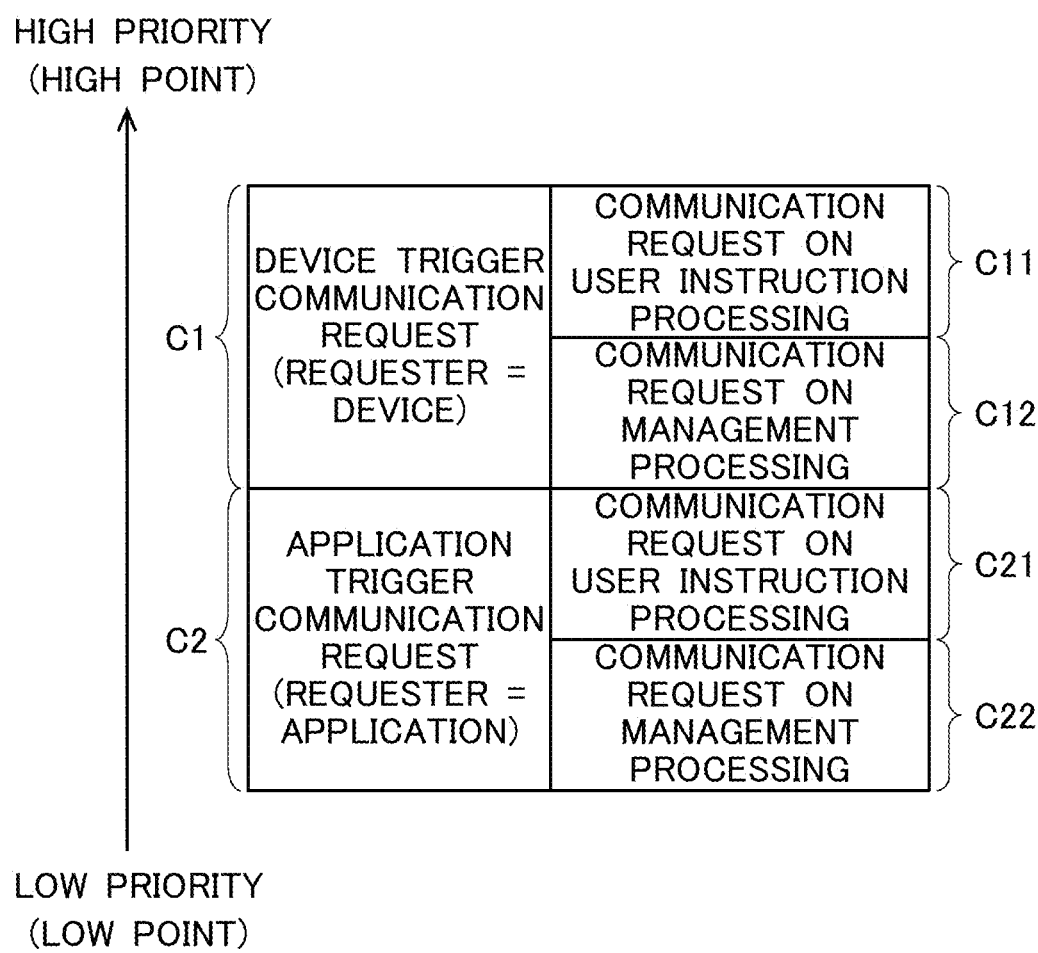
FIG. 7 is a view showing a classification of tunnel connection requests.
Figure 10:
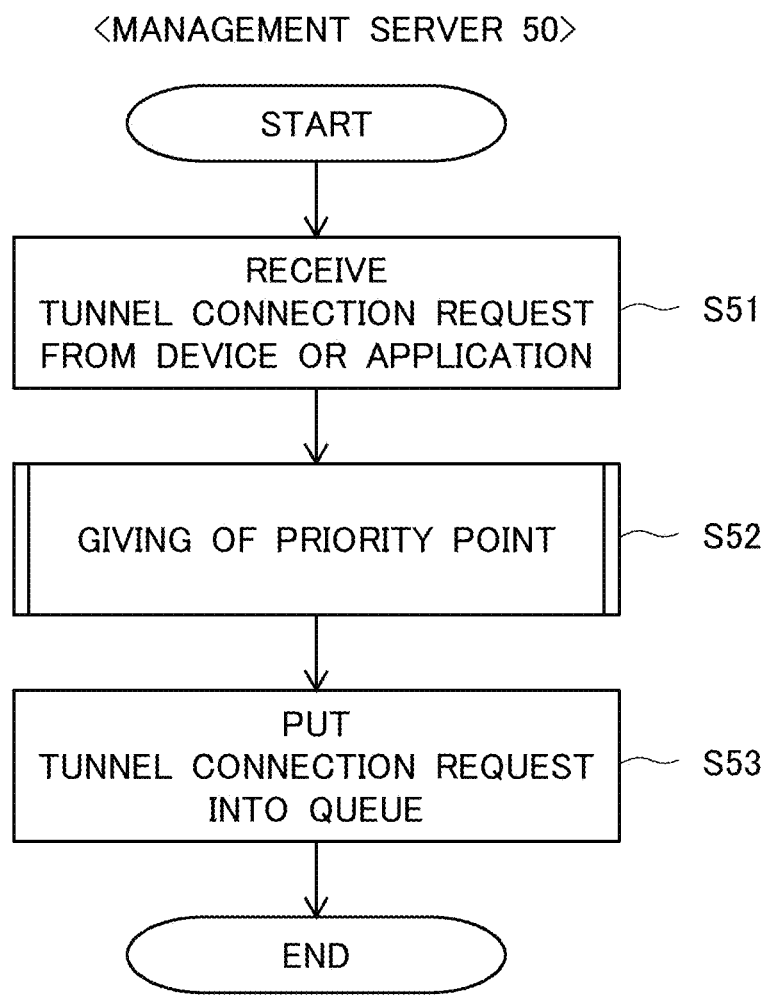
FIG. 10 is a flowchart showing an operation of a management server.
Figure 11:
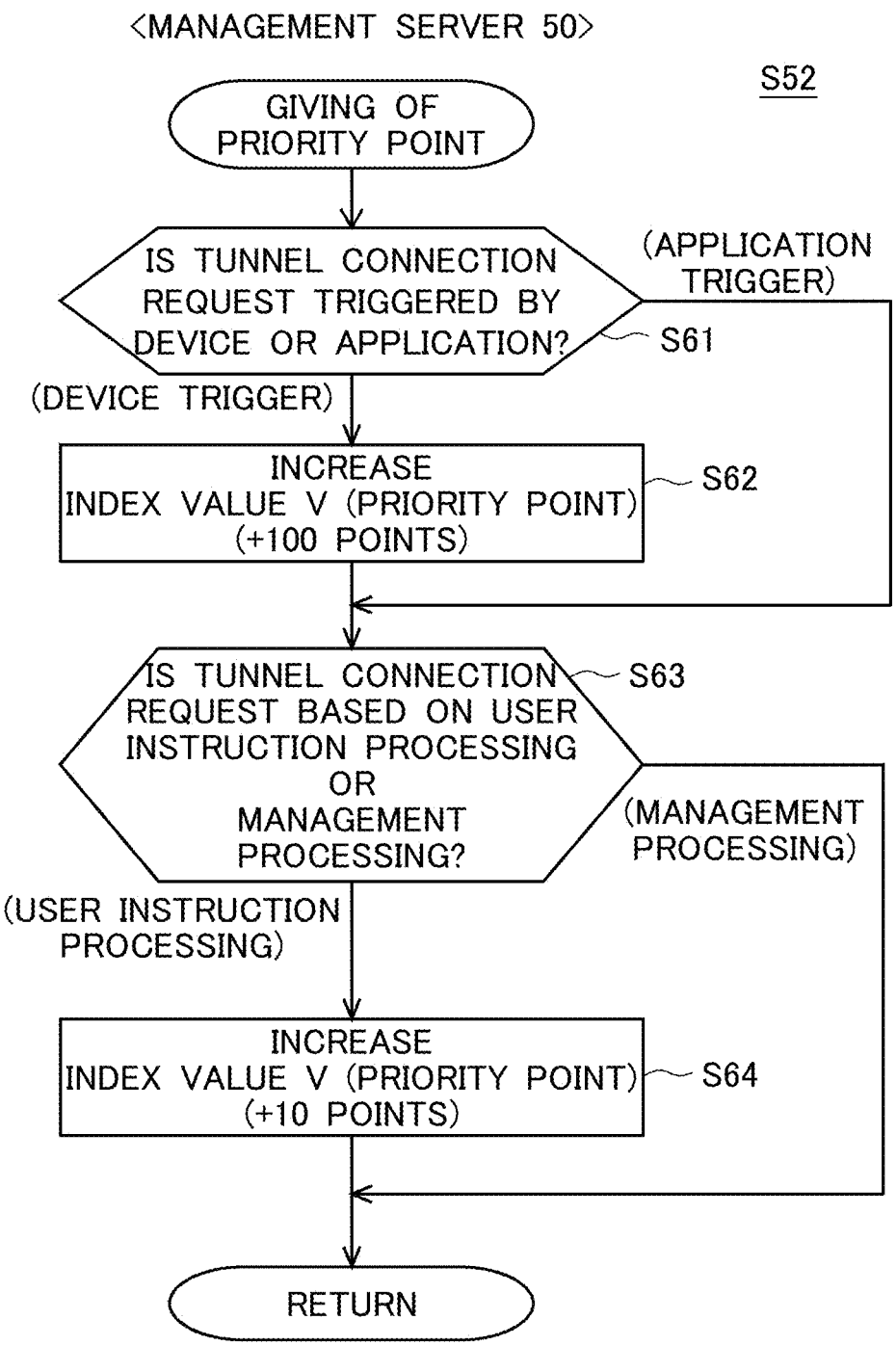
FIG. 11 is a flowchart showing a detail of part of the operation shown in FIG. 10.

Then, in the present preferred embodiment, the management server 50 performs an operation of determining the order of execution, and the like, in consideration of various elements as shown in FIGS. 7 to 11 and the like. As a result, for example, the tunnel connection request on the "cloud scan" is performed in preference to the tunnel connection request on the "cloud print" (see FIG. 9). Herein, FIG. 7 is a view showing a classification (described later) of the tunnel connection requests, FIG. 8 is a view showing a given point in accordance with the classification, and FIG. 9 is a view showing an exemplary case where an evaluation value is given for each of the tunnel connection requests. Further, FIGS. 10 and 11 are flowcharts showing an operation of the management server 50 in accordance with the first preferred embodiment.

With reference FIG. 10, first, an overview of the operation of the management server 50 will be described.

As shown in FIG. 10, when the management server 50 receives each communication request in Step S51, the management server 50 determines the degree of priority for the communication request (and the tunnel connection request on the basis of the communication request) in Step S52. In detail, the management server 50 calculates an evaluation value (an evaluation value (index value V) on the degree of priority) for each of the plurality of communication requests (and the plurality of tunnel connection requests) and determines the degree of priority for each of the plurality of tunnel connection requests on the basis of the corresponding evaluation value.

After the degree of priority is determined, each of the communication requests (and the tunnel connection requests) is put into the queue (Step S53).

After that, the management server 50 sequentially performs each of the tunnel connection requests whose turn of execution comes. In other words, the management server 50 performs the plurality of tunnel connection requests in the order in accordance with the respective degrees of priority. It is thereby possible to efficiently perform the communication requests and the tunnel connection requests on the basis of the communication requests.

1-6. Priority Determination Operation of Tunnel Connection Request

Next, a detail of a priority determination process (Step S52) will be described. Before the description with reference to FIG. 11 (the detailed flowchart of Step S52), however, an overview of the priority determination process will be described with reference to FIGS. 7 to 9.

Classification of Requested Processings 1: Application Trigger/Device Trigger

In the present preferred embodiment, a plurality of communication requests (access requests) are classified in accordance with the requesters thereof (the "device" or the "application") (into a "device trigger communication request" or an "application trigger communication request"). In other words, a plurality of tunnel connection requests on the basis of the plurality of communication requests are classified into the tunnel connection request on the basis of the "device trigger communication request" and the tunnel connection request on the basis of the "application trigger communication request".

Classification of Requested Processings 2: User Instruction Processing (Non-Management Processing)/Management Processing Further, a plurality of communication requests (access requests) are classified also in accordance with the kind of processing (the "user instruction processing" or the "management processing"). In other words, a plurality of tunnel connection requests on the basis of the plurality of communication requests are classified into the tunnel connection request on the basis of the communication request for the "user instruction processing" and the tunnel connection request on the basis of the communication request for the "management processing".

Herein, the "communication request for performing the user instruction processing" is a communication request for performing a processing (the user instruction processing) on the basis of an explicit user instruction (a manual instruction from the general user (also referred to as a "non-administrative user")).

On the other hand, the "communication request for performing the management processing" is a communication request for performing the management processing (a processing for management which is automatically started by an apparatus, not on the basis of the explicit instruction (manual instruction) by the general user). Further, while the "user instruction processing" is a processing premised on an instruction by the general user, the "management processing" is also expressed as a processing not premised on any instruction by the general user. Thus, the "user instruction processing" and the "management processing" are conceptually opposed to each other, and the "user instruction processing" is also expressed as the "non-management processing". Further, since the "management processing" is a processing performed, being unseen by the general user (in the background), unlike the "user instruction processing", the "management processing" is also referred to as a "background processing".

For example, the above-described "cloud scan" is a scan processing (scan job) on the basis of an explicit scan instruction by the user of the device 10. The communication request for performing the cloud scan is also expressed as a "communication request for performing the user instruction processing". Similarly, the above-described "cloud print" is a print processing (print job) on the basis of an explicit print instruction by the user of the application 80. The communication request for performing the cloud print is also expressed as a "communication request for performing the user instruction processing".

On the other hand, the "result notification" is a processing (processing result automatic notification processing) for automatically notifying the application 80 of a processing result of the processing by the device 10. The communication request for performing the result notification is also expressed as a "communication request for performing the management processing". Similarly, the "apparatus state acquisition" (or "apparatus information acquisition") is an information acquisition processing by the application 80 (a processing in which the application 80 automatically acquires the information on the device 10 and/or the gateway 30). The communication request for performing the "apparatus state acquisition" is also expressed as a "communication request for performing the management processing".

Further, the "result notification" processing is also classified into the "device trigger communication request" processing since the requester of the processing is the device 10. The "apparatus state acquisition" processing is also classified into the "application trigger communication request" processing since the requester of the processing is the application 80.

Multiple Classification of Requested Processings

The plurality of communication requests (access requests) are broadly classified into four categories by using the above-described two classification criteria, i.e., (1) whether the communication request is the "device trigger communication request" or not, and (2) the processing on the basis of the communication request is the "user instruction processing (non-management processing)" or not. Similarly, the plurality of tunnel connection requests on the basis of the plurality of communication requests are broadly classified into four categories by using the two classification criteria. Though the following description will be made mainly on the classification of the plurality of tunnel connection requests, the plurality of communication requests are classified in the same manner.

FIG. 7 is a view showing such a classification. In FIG. 7, the plurality of tunnel connection requests on the basis of the plurality of communication requests are classified into a plurality of kinds. The plurality of kinds include the following four categories. The four categories are C11: the tunnel connection request on the basis of the "device trigger communication request" and the "communication request for the user instruction processing", C12: the tunnel connection request on the basis of the "device trigger communication request" and the "communication request for the management processing", C21: the tunnel connection request on the basis of the "application trigger communication request" and the "communication request for the user instruction processing", and C22: the tunnel connection request on the basis of the "application trigger communication request" and the "communication request for the management processing".

When the management server 50 receives each communication request, the management server 50 analyzes the processing content (processing details) of the communication request on the basis of data or the like included in the communication request and comprehends (acquires) the kind of processing corresponding to the communication request, and the like. For example, the management server 50 acquires the number indicting the kind of processing (the "cloud scan"="001", the "cloud print"="002", the "apparatus state acquisition"="003", the "result notification"="004", and the like) from the data. Further, the management server 50 determines which one of the four categories the tunnel connection request for each kind of processing falls into, on the basis of the kind of processing which is acquired from the data and the data table (the table indicating the correspondence between each kind of processing and the above-described four categories C11, C12, C21, and C22) in the management server 50. In other words, on the basis of the kind of processing and the data table, it is determined whether each tunnel connection request is the tunnel connection request on the basis of the "device trigger communication request" or the tunnel connection request on the basis of the "application trigger communication request". Further, on the basis of the kind of processing and the data table, it is also determined whether each tunnel connection request is the tunnel connection request on the basis of the "user instruction processing" or the tunnel connection request on the basis of the "management processing".

Then, the highest degree of priority (index value V) is given to the tunnel connection request belonging to the category C11, and the second highest degree of priority is given to the tunnel connection request belonging to the category C12. Further, the third highest degree of priority is given to the tunnel connection request belonging to the category C21, and the fourth highest degree of priority is given to the tunnel connection request belonging to the category C22.

More specifically, the points shown in FIGS. 8 and 9 are given. "+100" points are given to the tunnel connection request on the basis of the "device trigger communication request", and "+0" points are given to the tunnel connection request on the basis of the "application trigger communication request". Further, "+10" points are given to the tunnel connection request on the basis of the "communication request for the user instruction processing", and "+0" points are given to the tunnel connection request on the basis of the "communication request for the management processing".

FIG. 11 shows an operation of giving such a point (evaluation value). In Step S61 of FIG. 11, it is determined whether the tunnel connection request is based on the device trigger communication request or not. When it is determined that the tunnel connection request is based on the device trigger communication request, "+100" points are given to this tunnel connection request (Step S62). On the other hand, when it is determined that the tunnel connection request is based on the application trigger communication request, no point is given to this tunnel connection request. Further, by such a point distribution processing (addition processing), the tunnel connection request on the basis of the device trigger communication request is performed in preference to the tunnel connection request on the basis of the application trigger communication request.

Furthermore, in Step S63, it is determined whether the tunnel connection request is based on the user instruction processing or not. When it is determined that the tunnel connection request is based on the user instruction processing, "+10" points are given to this tunnel connection request (Step S64). On the other hand, when it is determined that the tunnel connection request is based on the management processing, no point is given to this tunnel connection request. Further, by such a point distribution processing (addition processing), the tunnel connection request on the basis of the user instruction processing is performed in preference to the tunnel connection request on the basis of the management processing.

In this case, the weighting (additional value of "+100") for the tunnel connection request on the basis of the "device trigger communication request" is larger than the weighting (additional value of "+10") for the tunnel connection request on the basis of the "user instruction processing". With this, among the above-described two classification criteria, i.e., (1) whether the communication request is the "device trigger communication request" or not, and (2) the processing on the basis of the communication request is the "user instruction processing (non-management processing)" or not, more weight is given to the former criterion (1) than the latter criterion (2) (also see FIG. 7).

As a result, the total points (index value V) shown in FIG. 9 is given to the tunnel connection request belonging to each category. To the tunnel connection request belonging to the category C11 (in other words, the tunnel connection request on the basis of the device trigger communication request and also on the basis of the user instruction processing) (for example, the tunnel connection request on the cloud scan), 110 (=100+10) points are given in total (V=110) (see Steps S62 and S64). To the tunnel connection request belonging to the category C12 (in other words, the tunnel connection request on the basis of the device trigger communication request and also on the basis of the management processing) (for example, the tunnel connection request on the result notification), 100 (=100+0) points are given in total (V=100) (see Step S62). To the tunnel connection request belonging to the category C21 (in other words, the tunnel connection request on the basis of the application trigger communication request and also on the basis of the user instruction processing), 10 (=0+10) points are given in total (V=10) (see Step S64). To the tunnel connection request belonging to the category C22 (in other words, the tunnel connection request on the basis of the application trigger communication request and also on the basis of the management processing), 0 (=0+0) points are given in total (V=0).

Thus, the degree of priority (index value V) is given to each of the plurality of tunnel connection requests so that the tunnel connection requests C11, C12, C21, and C22 classified into four categories may be ranked in this descending order.

Then, the management server 50 determines the priority of the plurality of tunnel connection requests on the basis of these index values V. Specifically, the management server 50 gives the priorities to the four kinds of tunnel connection requests C11, C12, C21, and C22 and performs these tunnel connection requests in this order.

Further, when two or more tunnel connection requests have absolutely the same index value V, the two or more tunnel connection requests are performed (processed) in accordance with the order of reception.

1-7. Example of Priority Determination Process, Etc

FIGS. 12 to 15 are conceptual diagrams each showing a state in the queue of the management server 50. With reference to these figures, an example of the priority determination process will be described.

Figure 12:
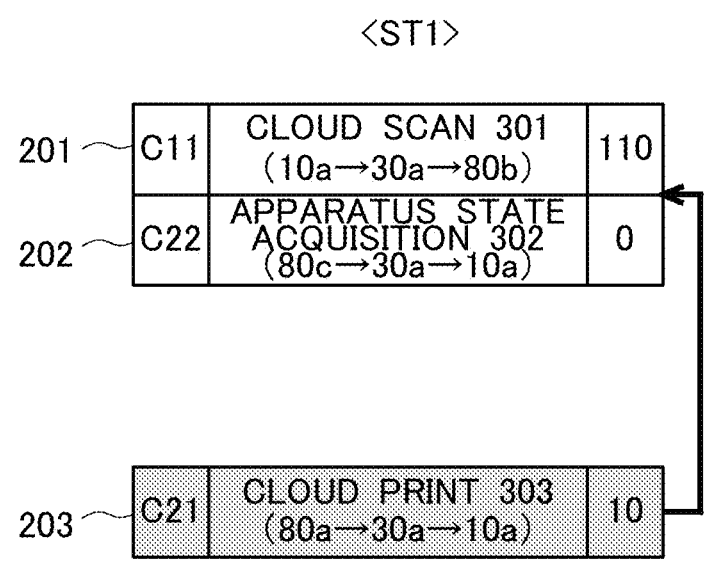

In a state ST1 of FIG. 12, the tunnel connection request 201 (C11) corresponding to the cloud scan 301 and the tunnel connection request 202 (C22) corresponding to the apparatus state acquisition processing (302) are already put in the queue.

Herein, the cloud scan 301 is a processing requesting communication from the device 10a toward the application 80b via the gateway 30a. The apparatus state acquisition processing 302 is a processing requesting communication from the application 80c toward the device 10a via the gateway 30a. Further, the tunnel connection request 201 on the cloud scan 301 is provided with the index value V of "+110", and the tunnel connection request 202 on the apparatus state acquisition processing 302 is provided with the index value V of "+0".

As shown in FIG. 12, in the state ST1, the communication request on the cloud print 303 is further received. Further, the cloud print 303 is a processing requesting communication from the application 80a toward the device 10a via the gateway 30a.

When the communication request is received, the management server 50 sets the index value V of the tunnel connection request 203 (C21) corresponding to the cloud print 303 to "+10". Then, the management server 50 arranges the tunnel connection request 203 on the cloud print 303 to a position next to the tunnel connection request 201 on the cloud scan 301 (and previous to the tunnel connection request 202 on the apparatus state acquisition processing 302) in the queue so that the tunnel connection requests may be ranked in the descending order of the index value V (also see FIG. 13).

Figure 13:
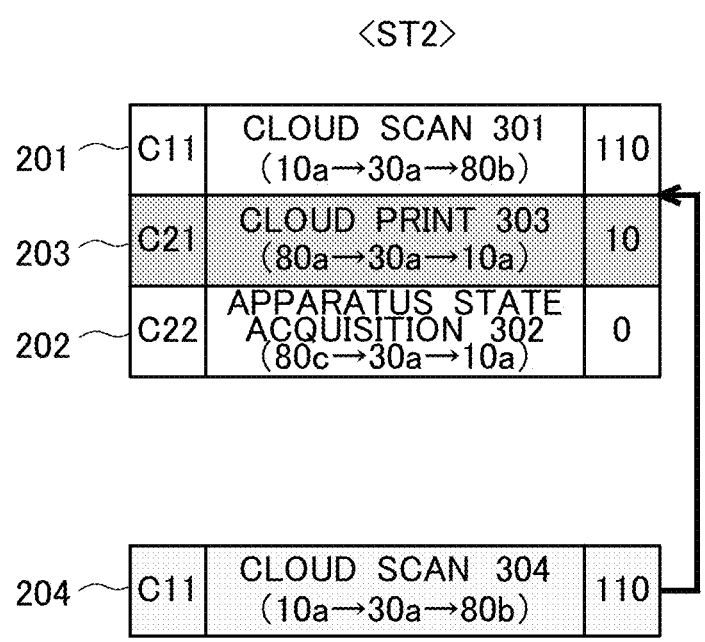

Next, as shown in FIG. 13 (state ST2), when the communication request corresponding to the cloud scan 304 is received, the management server 50 sets the index value V of the tunnel connection request 204 (C11) corresponding to this communication request to "+110". Herein, the cloud scan 304 is a processing requesting communication from the device 10a toward the application 80b via the gateway 30a. Then, the management server 50 arranges the tunnel connection request 204 on the cloud scan 304 to a position next to the tunnel connection request 201 on the cloud scan 301 (and previous to the tunnel connection request 203 on the cloud print 303) in the queue so that the tunnel connection requests may be ranked in the descending order of the index value V (also see FIG. 14).

Figure 14:
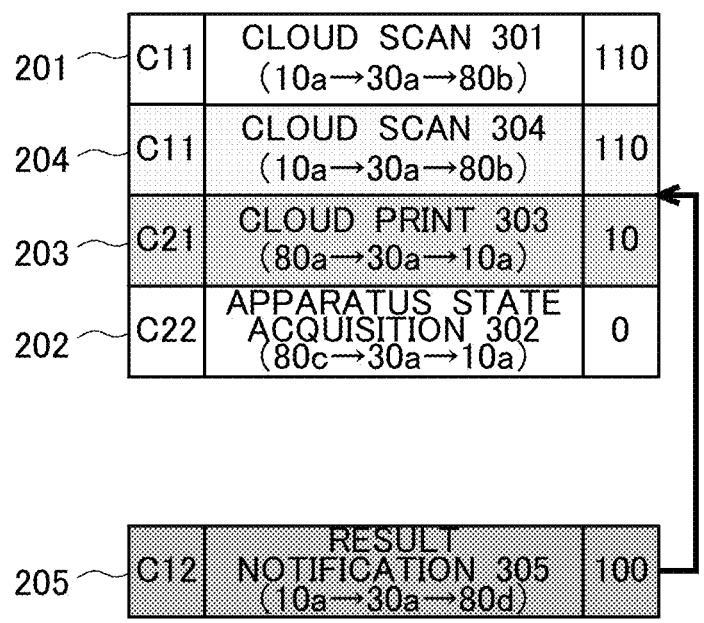

Next, as shown in FIG. 14 (state ST3), when the communication request corresponding to the result notification processing 305 is received, the management server 50 sets the index value V of the tunnel connection request 205 (C12) corresponding to this communication request to "+100". Herein, the result notification processing 305 is a processing requesting communication from the device 10a toward the application 80d via the gateway 30a. Then, the management server 50 arranges the tunnel connection request 205 on the result notification processing 305 to a position next to the tunnel connection request 204 on the cloud scan 304 (and previous to the tunnel connection request 203 on the cloud print 303) in the queue so that the tunnel connection requests may be ranked in the descending order of the index value V (also see FIG. 15).

Thus, determined is the order of execution of the plurality of communication requests and the plurality of tunnel connection requests on the basis of the plurality of communication requests. Then, as described above, on the basis of the order of execution, the plurality of communication requests and the plurality of tunnel connection requests on the basis of plurality of communication requests are performed.

More in detail, as described above, among the two classification criteria, i.e., (1) whether the communication request is the "device trigger communication request" or not, and (2) the processing on the basis of the communication request is the "user instruction processing (non-management processing)" or not, more weight is given to the former criterion (1) than the latter criterion (2).

More specifically, first, the former criterion (1) is applied preferentially (with relatively large weighting), and the tunnel connection requests C1 (C11 and C12) on the basis of the "device trigger communication request" are performed in preference to the tunnel connection requests C2 (C21 and C22) on the basis of the "application trigger communication request".

Further, the latter criterion (2) is applied next preferentially (with relatively small weighting), and among the tunnel connection request on the basis of the "non-management processing" and the tunnel connection request on the basis of the "management processing", the tunnel connection request on the basis of the "non-management processing" is performed in preference to the tunnel connection request on the basis of the "management processing". More in detail, among the tunnel connection requests C1 on the basis of the same "device trigger communication request" (see FIG. 7), the tunnel connection request C11 on the basis of the "user instruction processing (non-management processing)" is performed in preference to the tunnel connection request C12 on the basis of the "management processing". Similarly, among the tunnel connection requests C2 on the basis of the same "application trigger communication request", the tunnel connection request C21 on the basis of the "user instruction processing (non-management processing)" is performed in preference to the tunnel connection request C22 on the basis of the "management processing".

Thus, among the plurality of tunnel connection requests, the tunnel connection requests C11, C12, C21, and C22 are performed with priority given in this order.

1-8. Effects of the First Preferred Embodiment, Etc

With the above operation, among the plurality of tunnel connection requests, the tunnel connection request on the basis of the device trigger communication request is performed in preference to the tunnel connection request on the basis of the application trigger communication request. The plurality of tunnel connection requests are thereby performed in a preferable order.

In such a case, when processings by the applications are accumulated (the processing loads in the applications are concentrated), it is relatively easy to increase the processing capability on the application side by changing the hardwares on the application side, or the like, (e.g., adding the hardwares of the cloud servers, or the like). On the other hand, when processings by the devices are accumulated, it is relatively difficult to increase the processing capability of the devices by changing and adding the hardwares on the device side, or the like. In particular, when the processings by the devices are concentrated in the relatively later part of the queue, the processings are started from the relatively late point in time and delays of the processing period and the like occur, and there is high probability that the end point in time (the end time) of the processing may be largely delayed. In contrast to this, when the processings by the devices are started at relatively early point in time, the above condition can be avoided or controlled.

Further, in most cases, the processings requested by the device side (device trigger request processings) are processings which are in particular closely related to the hardwares of the devices (processings having relatively high relevance with the processings by the devices). As described above, in consideration of little room for expansion of the hardware capability of the devices and the like, it is preferable to perform the "device trigger request processing" in preference to the "application trigger request processing".

Furthermore, in most cases, the processing on the "device trigger communication request" is required to achieve relatively high immediacy, as compared with the processing on the "application trigger communication request". For example, it is expected in most cases that the "cloud scan" (the device trigger communication request processing (and the user instruction processing)) should be performed early, as compared with the "cloud print" (the application trigger communication request processing (and the user instruction processing)). The "cloud scan" (the device trigger communication request processing) is a processing on the basis of an instruction from a person inside the LAN (a person present near the device 10). On the other hand, the "cloud print" (the processing corresponding to the application trigger communication request) is a processing on the basis of an instruction from a person outside the LAN (a person away from the device) in most cases. The person near the device wants to perform an operation accompanied with an approach to the device (a scan operation using a scanner of the device, or the like) in a relatively early time, in most cases. Thus, in general, the "cloud scan" has higher immediacy requirement than the "cloud print" has. Then, when the "cloud scan" is performed in preference to (prior to) the "cloud print", such a requirement can be satisfied.

Further, the "result notification" processing (the device trigger communication request processing (and management processing)) is required to achieve relatively high immediacy, as compared with the "apparatus state acquisition" processing (the application trigger communication request processing (and the management processing)). The "result notification" processing (the processing corresponding to the device trigger communication request) is a processing of notifying the processing results of various processings in the devices 10 inside the LAN, and a processing having a relatively high immediacy requirement. In other words, the immediacy requirement of the "apparatus state acquisition" processing is lower than that of the "result notification" processing. In consideration of such conditions, it is preferable to perform the "result notification" processing (the "device trigger request processing") in preference to the "apparatus state acquisition" processing (the "application trigger request processing").

In the above-described preferred embodiment, in consideration of the above circumstances, the tunnel connection request on the basis of the device trigger communication request is performed in preference to the tunnel connection request on the basis of the application trigger communication request. It is thereby possible to efficiently achieve a stable (secure) system operation.

Further, in the above-described preferred embodiment, the tunnel connection request on the basis of the "user instruction processing" is performed in preference to the tunnel connection request on the basis of the "management processing". It is thought that the user instruction processing (non-management processing) on the basis of an instruction operation of a general user has high immediacy requirement on the basis of that this processing has a feature that the general user who intends to perform this processing actually exists (the general user actually performs the desired operation), and this processing is performed preferentially. With this, the tunnel connection request on the basis of the user instruction processing having such a feature can be preferentially performed appropriately.

2. The Second Preferred Embodiment 2-1. Overview

The second preferred embodiment is a variation of the first preferred embodiment. Hereinafter, description will be made, centering on the difference between the first and second preferred embodiments.

In the above-described first preferred embodiment, the management server 50 determines the order of execution of the plurality of tunnel connection requests on the basis of the plurality of communication requests received from the applications 80 or the devices 10, on the basis of only the classification result of the request contents of the plurality of communication requests.

On the other hand, the second preferred embodiment shows another aspect where the order of execution of the plurality of tunnel connection requests are determined on the basis of not only the classification result of the request contents of the plurality of communication requests, but also a result of estimation on the loads of these apparatuses (the devices 10, the gateways 30, and the cloud servers 70 (the applications 80)) at the point in time of receiving the plurality of communication requests.

Figure 16:
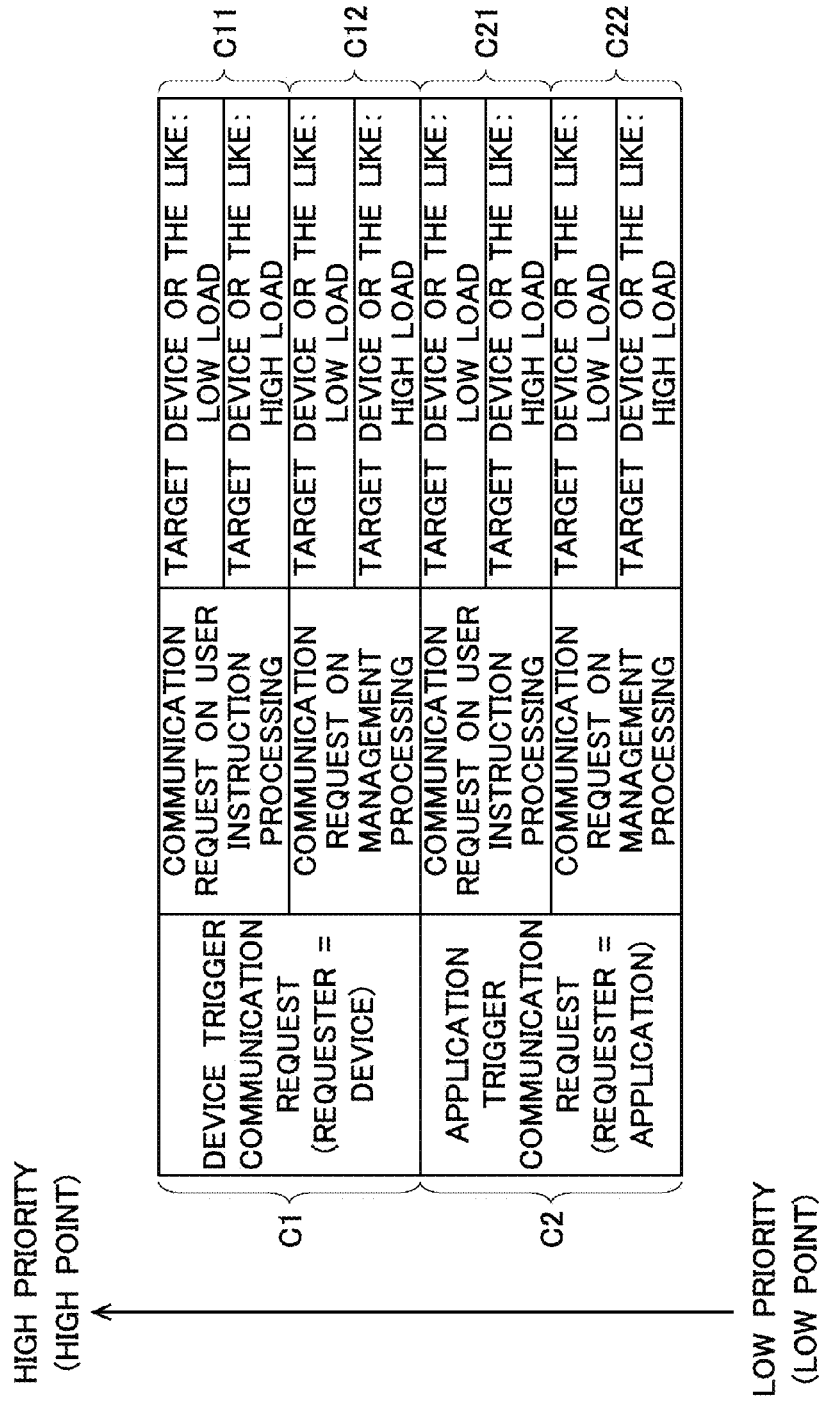
FIG. 16 is a view showing a classification of tunnel connection requests in accordance with a second preferred embodiment.

Specifically, the priorities of two or more tunnel connection requests classified into the same category among the above-described four categories (C11, C12, C21, and C22) are each determined in accordance with the loads of the apparatuses and the like relevant to each of the two or more tunnel connection requests (see FIG. 16). FIG. 16 is a view showing a classification (classification of the tunnel connection requests) in accordance with the second preferred embodiment.

In other words, in this second preferred embodiment, in addition to the above-described two classification criteria (1) and (2), used is the criterion (3) on whether or not each of the apparatuses and the like is in a high load state where the load is a predetermined degree or more at the point in time of receiving the plurality of communication requests. The classification criterion (3) is considered with a weighting lower than these of the above-described two classification criteria (1) and (2).

Further, in the second preferred embodiment, the management server 50 estimates the load of each of the apparatuses and the like relevant to each communication request on the basis of a connection status of the tunnel connection (the current number of tunnel connections, or the like) on the apparatus and the like. As mentioned above, the connection status of the tunnel connection (the number of connections, or the like) is managed by the management server 50 (the information management part 65, the management table 69, and the like).

2-2. Load of Device 10

For example, when the number of tunnel connections which have been already established between the gateway 30 and the cloud server 70 (the application 80) and are relevant to a specific device 10 is larger than a threshold value TH1 ("2"), the management server 50 determines that the load of the specific device 10 is larger than a predetermined degree (in short, the specific device 10 is in a "busy state"). On the other hand, when the number of tunnel connections relevant to the specific device 10 is smaller than the threshold value TH1, the management server 50 determines that the load of the specific device 10 is smaller than the predetermined degree (in short, the specific device 10 is in a "non-busy state"). Further, when the load is equal to the predetermined degree, the state may be determined as the busy state or conversely may be determined as the non-busy state.

Then, the management server 50 performs the tunnel connection request on the device 10 which is determined to be in the non-busy state (the tunnel connection request on the busy device) in preference to the tunnel connection request on the device 10 which is determined to be in the busy state (the tunnel connection request on the non-busy device).

More in detail, when the management server 50 receives a tunnel connection request, the management server 50 determines whether the device 10 is in the "busy state" or not, on the basis of the number of (other) tunnel connections which have been already established at the point in time of reception, on the device 10 relevant to the received tunnel connection request.

Figure 17:
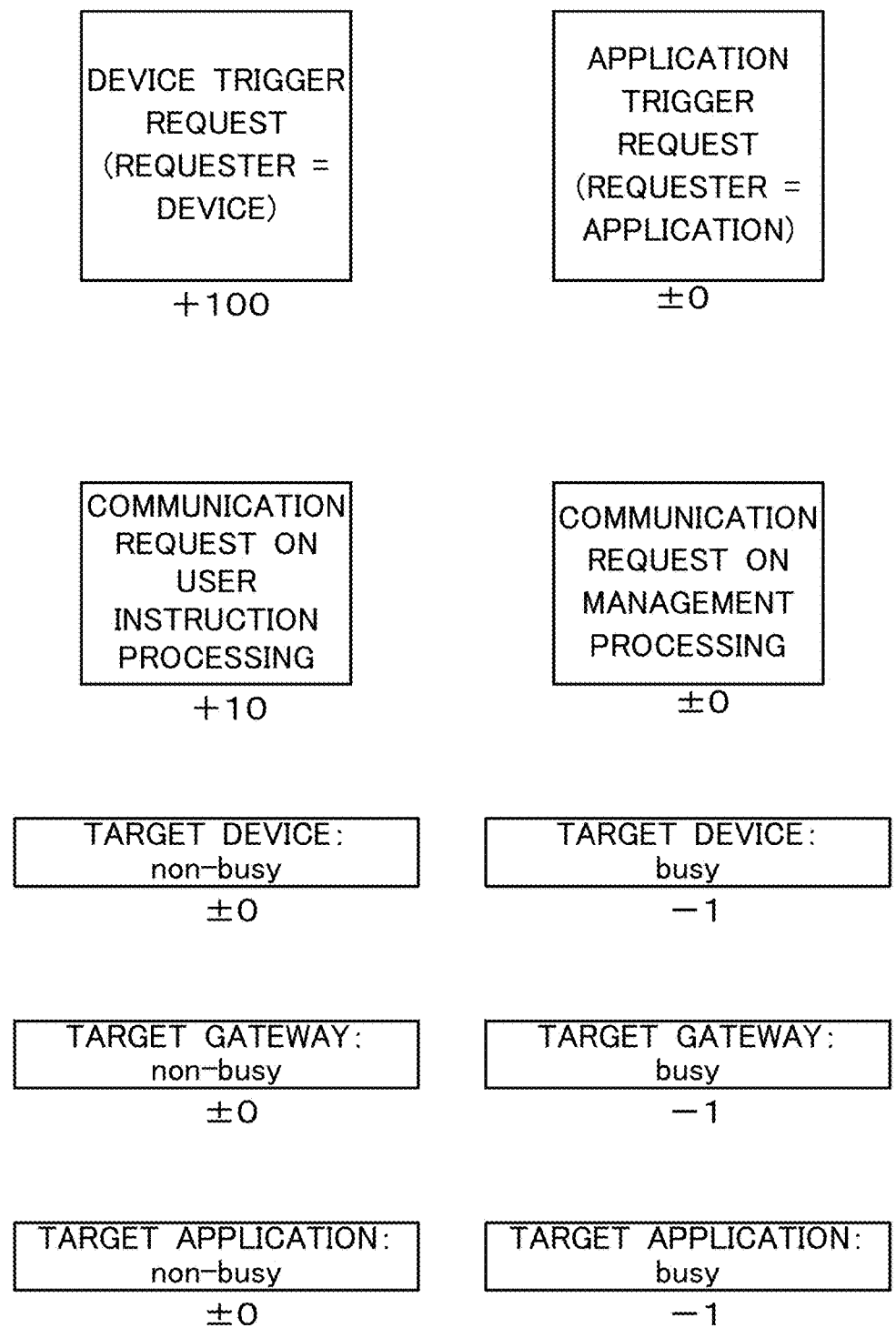
FIG. 17 is a view showing a given point in accordance with the classification.

As shown in FIG. 17, when the device 10 is in the "busy state", a minus point ("−1" point) is given to the received tunnel connection request. On the other hand, when the device 10 is in the "non-busy state", zero points ("0" points) are given to the received tunnel connection request. Then, by further adding the minus point or the like (consequently, by subtraction from) to the point provision result which is the same as that obtained in the first preferred embodiment, the evaluation value (index value V) of each tunnel connection request is calculated, and the priority is determined on the basis of the evaluation value.

With this, the tunnel connection request on the device 10 which is in the "non-busy state" among the two or more tunnel connection requests classified into the same category (any one of C11, C12, C21, and C22) is performed in preference to the tunnel connection request on the device 10 which is in the "busy state". In other words, since the tunnel connection request on the relatively available device 10 is performed relatively in preference, it is possible to avoid or control the occurrence of waiting time and/or elongation of processing time, which is (are) caused by the execution of the tunnel connection on the device 10 which is in the busy state. Therefore, more efficient operation can be achieved as a whole system.

2-3. Load of Gateway 30

Similarly, for example, when the number of tunnel connections which have been already established between the gateway 30 and the cloud server 70 (the application 80) and are relevant to a specific gateway 30 is larger than a threshold value TH2 ("4"), the management server 50 determines that the load of the specific gateway 30 is larger than a predetermined degree (in short, the specific gateway 30 is in the "busy state"). On the other hand, when the number of tunnel connections relevant to the specific gateway 30 is smaller than the threshold value TH2, the management server 50 determines that the load of the specific gateway 30 is smaller than the predetermined degree (in short, the specific gateway 30 is in the "non-busy state"). Further, when the load is equal to the predetermined degree, the state may be determined as the busy state or conversely may be determined as the non-busy state.

Then, the management server 50 performs the tunnel connection request on the gateway 30 which is determined to be in the non-busy state (the tunnel connection request on the busy gateway) in preference to the tunnel connection request on the gateway 30 which is determined to be in the busy state (the tunnel connection request on the non-busy gateway).

More in detail, when the management server 50 receives a tunnel connection request, the management server 50 determines whether the gateway 30 is in the "busy state" or not, on the basis of the number of (other) tunnel connections which have been already established at the point in time of reception, on the gateway 30 relevant to the received tunnel connection request.

As shown in FIG. 17, when the gateway 30 is in the "busy state", a minus point ("−1" point) is given to the received tunnel connection request. On the other hand, when the gateway 30 is in the "non-busy state", zero points ("0" points) are given to the received tunnel connection request. Then, by further adding the minus point or the like to the point provision result which is the same as that obtained in the first preferred embodiment, the evaluation value (index value V) of each tunnel connection request is calculated, and the priority is determined on the basis of the evaluation value.

With this, the tunnel connection request on the gateway 30 which is in the "non-busy state" among the two or more tunnel connection requests classified into the same category (any one of C11, C12, C21, and C22) is performed in preference to the tunnel connection request on the gateway 30 which is in the "busy state". In other words, since the tunnel connection request on the relatively available gateway 30 is performed relatively in preference, it is possible to avoid or control the occurrence of waiting time and/or elongation of processing time, which is (are) caused by the execution of the tunnel connection on the gateway 30 which is in the busy state. Therefore, more efficient operation can be achieved as a whole system.

2-4. Load of Application 80

Similarly, for example, when the number of tunnel connections which have been already established between the gateway 30 and the cloud server 70 (the application 80) and are relevant to a specific application 80 is larger than a threshold value TH3 ("10"), the management server 50 determines that the load of the specific application 80 is larger than a predetermined degree (in short, the specific application 80 is in the "busy state"). On the other hand, when the number of tunnel connections relevant to the specific application 80 is smaller than the threshold value TH3, the management server 50 determines that the load of the specific application 80 is smaller than the predetermined degree (in short, the specific application 80 is in the "non-busy state"). Further, when the load is equal to the predetermined degree, the state may be determined as the busy state or conversely may be determined as the non-busy state.

Then, the management server 50 performs the tunnel connection request on the application 80 which is determined to be in the non-busy state (the tunnel connection request on the busy application) in preference to the tunnel connection request on the application 80 which is determined to be in the busy state (the tunnel connection request on the non-busy application).

More in detail, when the management server 50 receives a tunnel connection request, the management server 50 determines whether the application 80 is in the "busy state" or not, on the basis of the number of (other) tunnel connections which have been already established at the point in time of reception, on the application 80 relevant to the received tunnel connection request.

As shown in FIG. 17, when the application 80 is in the "busy state", a minus point ("−1" point) is given to the received tunnel connection request. On the other hand, when the application 80 is in the "non-busy state", zero points ("0" points) are given to the received tunnel connection request. Then, by further adding the minus point or the like to the point provision result which is the same as that obtained in the first preferred embodiment, the evaluation value (index value V) of each tunnel connection request is calculated, and the priority is determined on the basis of the evaluation value.

With this, the tunnel connection request on the application 80 which is in the "non-busy state" among the two or more tunnel connection requests classified into the same category (any one of C11, C12, C21, and C22) is performed in preference to the tunnel connection request on the application 80 which is in the "busy state". In other words, since the tunnel connection request on the relatively available application 80 is performed relatively in preference, it is possible to avoid or control the occurrence of waiting time and/or elongation of processing time, which is (are) caused by the execution of the tunnel connection on the application 80 which is in the busy state. Therefore, more efficient operation can be achieved as a whole system.

2-5. Priority Determination Operation of Tunnel Connection Request, Etc

Figure 20:
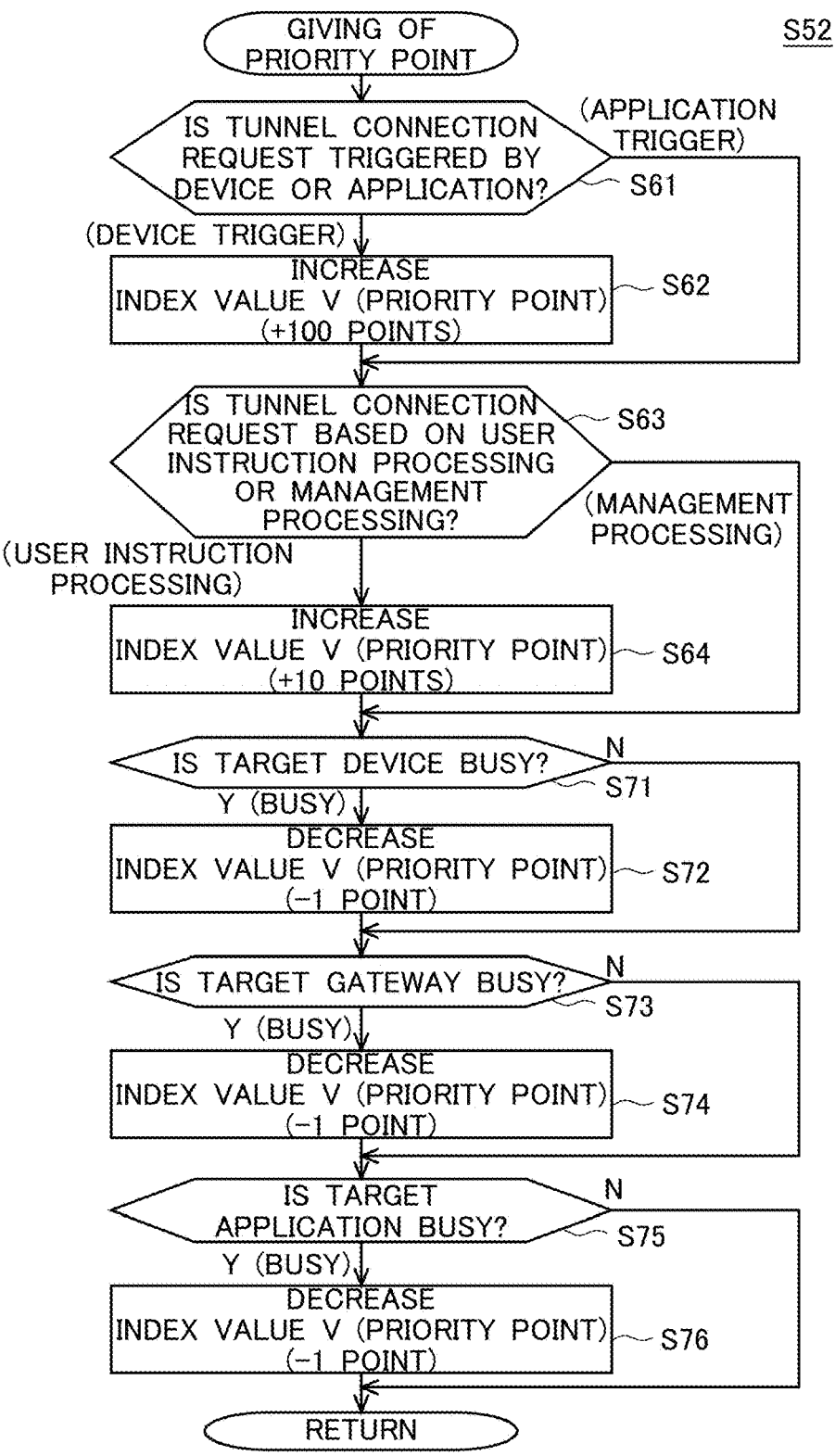
FIG. 20 is a flowchart showing part of an operation of the management server.

Also in the second preferred embodiment, the same operation as that in the first preferred embodiment is performed. An operation of FIG. 20, however, is performed instead of the operation of FIG. 11. FIG. 20 is a flowchart showing an operation of determining the priority of the tunnel connection request.

As shown in FIG. 20, Steps S61 to S64 are the same as those in the first preferred embodiment.

After that, when the device 10 relevant to the received tunnel connection request is in the "busy state", a minus point ("−1" point) is given to the received tunnel connection request (Steps S71 and S72). On the other hand, when the device 10 is in the "non-busy state", no point is ("0" points are) given to the received tunnel connection request.

Further, when the gateway 30 relevant to the received tunnel connection request is in the "busy state", a minus point ("−1" point) is given to the received tunnel connection request (Steps S73 and S74). On the other hand, when the gateway 30 is in the "non-busy state", no point is ("0" points are) given to the received tunnel connection request.

Furthermore, when the application 80 relevant to the received tunnel connection request is in the "busy state", a minus point ("−1" point) is given to the received tunnel connection request (Steps S75 and S76). On the other hand, when the application 80 is in the "non-busy state", no point is ("0" points are) given to the received tunnel connection request.

The point given in Steps S71 to S76 is also referred to as a load adjustment point. In the second preferred embodiment, by adding the load adjustment point calculated in Steps S71 to S76 to the point calculated in Steps S61 to S64, the index value V is calculated. Then, on the basis of the index value V, the order of execution of each of the tunnel connection requests is determined. Further, when two or more tunnel connection requests have absolutely the same index value V (the point obtained after adding (subtracting) the load adjustment point in Steps S71 to S76), the two or more tunnel connection requests are performed (processed) in accordance with the order of reception.

2-6. Example of Priority Determination Process Until State ST3

FIGS. 21 to 25 are conceptual diagrams each showing a state in the queue of the management server 50. With reference to these figures, an example of the priority determination process will be described.

Also in the second preferred embodiment, in the states ST1 to ST3, the same operations as those in the first preferred embodiment (see FIGS. 12 to 14) are performed. Further, FIG. 21 shows a state where a tunnel connection request 206 on a new cloud scan 306 is received in the processing result on the state ST3 (see FIG. 15).

In the second preferred embodiment, however, a minus point is also given in consideration of the respective loads of the apparatuses (the devices 10, the gateways 30, and the cloud servers 70 (the applications 80)). Herein, assumed is a case where only the device 10a among the plurality of devices 10 is busy, only the gateway 30a among the plurality of gateways 30 is busy, and only the application 80b among the plurality of applications 80 is busy.

In this case, to the tunnel connection request 201 on the cloud scan 301 (see the highest row of FIG. 21), "−1" point on the basis of that the device 10a is in the busy state, "−1" point on the basis of that the gateway 30a is in the busy state, and "−1" point on the basis of that the application 80b is in the busy state, i.e., a total value of "−3" points is given (see the second column from the right side (the column of load adjustment point) in FIG. 21).

Then, by adding the load adjustment point of "−3" to the other point of "110", the evaluation value (index value V) of the tunnel connection request 201 on the cloud scan 301 is set to "107" points in total (see the rightmost column (the column of total value) in FIG. 21, and the second box from the top in FIG. 18).

Similarly, the index value V of the tunnel connection request 204 on the cloud scan 304 is also set to "107" points in total.

Further, to the tunnel connection request 205 on the result notification processing 305, "−1" point on the basis of that the device 10a is in the busy state and "−1" point on the basis of that the gateway 30a is in the busy state, i.e., a total value of "−2" points is given. By adding the load adjustment point of "−2" to the other point of "100", the index value V of the tunnel connection request 205 on the result notification processing 305 is set to "98" points in total (see the rightmost column in FIG. 21, and the second box from the top in FIG. 19).

Similarly, the index value V of the tunnel connection request 203 on the cloud print 303 is set to "8" points in total (also see the lowest box in FIG. 18), and the index value V of the tunnel connection request 202 on the apparatus state acquisition processing 302 is set to "−2" points in total (see the lowest box in FIG. 19).

Further, the respective index values are set when these communication requests are received. Specifically, the respective index values V on the cloud scan 301, the apparatus state acquisition processing 302, the cloud print 303, the cloud scan 304, and the result notification processing 305 are set in this order when the communication requests on these processings are received. Then, in the queue, the tunnel connection requests on these communication requests are arranged in the order of priority as shown in FIG. 21. In FIG. 21 and the like, the plurality of tunnel connection requests are arranged from the top downward in the descending order of the priority.

State ST4

Next, as shown in FIG. 21 (the state ST4), when a new communication request, specifically, a communication request corresponding to a cloud scan 306 is received, the management server 50 sets the index value V of a tunnel connection request 206 (C11) corresponding to the communication request to "+108". Herein, the cloud scan 306 is a processing requesting the communication from the device 10b (not 10a) toward the application 80b via the gateway 30a, and the load adjustment point thereof is "−2". Then, the management server 50 arranges the tunnel connection request 206 on the cloud scan 306 to a position (the top position) previous to the tunnel connection request 201 on the cloud scan 301 in the queue so that the tunnel connection requests may be ranked in the descending order of the index value V (also see FIG. 22).

With this operation, the order of the priority among the two cloud scans 301 and 306 classified into the same category (C11) is determined in accordance with the magnitude of the load adjustment point. Specifically, the order of the priority among the two tunnel connection requests 201 and 206 on the basis of the two communication requests with the data communication toward the same application 80b via the same gateway 30a is determined in accordance with the respective load conditions of the different requesting devices 10a and 10b. Then, in accordance with the determined order of the priority, the two tunnel connection requests are performed. More in detail, the tunnel connection request 206 on the device 10b which is in the "non-busy state" is performed in preference to the tunnel connection request 201 on the device 10a which is in the "busy state". In other words, the management server 50 performs the tunnel connection request on the device 10b among the plurality of devices, on which the number of already-established tunnel connections is not larger than the threshold value TH1, in preference to the tunnel connection request on the device 10a among the plurality of devices, on which the number of already-established tunnel connections is larger than the threshold value TH1. Specifically, the tunnel connection request 206 on the device 10b which is relatively available is performed relatively in preference. Therefore, it is possible to avoid or control the occurrence of waiting time and/or elongation of processing time, which is (are) caused by the execution of the tunnel connection request 201 on the device 10a which is in the busy state. Further, more efficient operation can be achieved as a whole system.

State ST5

Next, as shown in FIG. 22 (the state ST5), when a communication request corresponding to a cloud print 307 is received, the management server 50 sets the index value V of a tunnel connection request 207 (C21) corresponding to the communication request to "+9". Herein, the cloud print 307 is a processing requesting the communication from the application 80a toward the device 10b (not 10a) via the gateway 30a, and the load adjustment point thereof is "−1". Then, the management server 50 arranges the tunnel connection request 207 on the cloud print 307 to "a position next to the tunnel connection request 205 on the result notification processing 305 and previous to the tunnel connection request 203 on the cloud print 303" in the queue (also see FIG. 23).

With this operation, the order of the priority among the two cloud prints 303 and 307 classified into the same category (C21) is determined in accordance with the magnitude of the load adjustment point. Specifically, the order of the priority among the two tunnel connection requests 203 and 207 on the basis of the two communication requests received from the same application 80a via the same gateway 30a is determined in accordance with the respective load conditions of the different relevant devices 10a and 10b. Then, in accordance with the determined order of the priority, the two tunnel connection requests are performed. More in detail, the tunnel connection request 207 on the device 10b which is in the "non-busy state" is performed in preference to the tunnel connection request 203 on the device 10a which is in the "busy state". In other words, since the tunnel connection request 207 on the device 10b which is relatively available is performed relatively in preference, it is possible to avoid or control the occurrence of waiting time and/or elongation of processing time, which is (are) caused by the execution of the tunnel connection request 203 on the device 10a which is in the busy state. Therefore, more efficient operation can be achieved as a whole system.

State ST6

Figure 23:
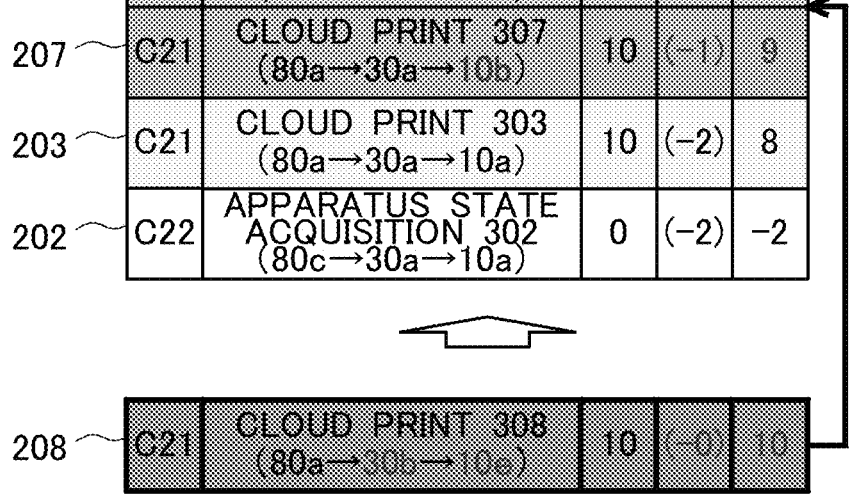

Next, as shown in FIG. 23 (the state ST6), when a communication request corresponding to a cloud print 308 is received, the management server 50 sets the index value V of a tunnel connection request 208 (C21) corresponding to the communication request to "+10". Herein, the cloud print 308 is a processing requesting the communication from the application 80a toward device 10e (not 10b) via the gateway 30b (not 30a), and the load adjustment point thereof is "0". Then, the management server 50 arranges the tunnel connection request 208 on the cloud print 308 to "a position next to the tunnel connection request 205 on the result notification processing 305 and previous to the tunnel connection request 207 on the cloud print 307" in the queue (also see FIG. 24).

With this operation, the order of the priority among the two cloud prints 307 and 308 classified into the same category (C21) is determined in accordance with the magnitude of the load adjustment point. Specifically, the order of the priority among the two tunnel connection requests 207 and 208 on the basis of the two communication requests received from the same application 80a is determined in accordance with the respective load conditions of the different relevant gateways 30b and 30a and the respective load conditions of the different relevant devices 10e and 10b. Herein, the respective load conditions of the relevant devices 10e and 10b are equal to each other (both "low load"), and the respective load conditions of the relevant gateways 30b and 30a are different from each other. Therefore, the order of the priority among the two tunnel connection requests 207 and 208 is practically determined in accordance with the respective load conditions of the relevant gateways 30b and 30a. Then, in accordance with the determined order of the priority, the two tunnel connection requests are performed. More in detail, the tunnel connection request 208 on the gateway 30b which is in the "non-busy state" is performed in preference to the tunnel connection request 207 on the gateway 30a which is in the "busy state". In other words, the management server 50 performs the tunnel connection request on the gateway 30b among the plurality of gateways 30, on which the number of already-established tunnel connections is not larger than the threshold value TH2, in preference to the tunnel connection request on the gateway 30a among the plurality of gateways 30, on which the number of already-established tunnel connections is larger than the threshold value TH2. Specifically, the tunnel connection request 208 on the gateway 30b which is relatively available is performed relatively in preference. Therefore, it is possible to avoid or control the occurrence of waiting time and/or elongation of processing time, which is (are) caused by the execution of the tunnel connection request 207 on the gateway 30a which is in the busy state. Further, more efficient operation can be achieved as a whole system.

State ST7

Next, as shown in FIG. 24 (the state ST7), when a communication request corresponding to a cloud scan 309 is received, the management server 50 sets the index value V of a tunnel connection request 209 (C11) corresponding to the communication request to "+108". Herein, the cloud scan 309 is a processing requesting the communication from the device 10a toward the application 80e (not 80b) via the gateway 30a, and the load adjustment point thereof is "−2". Then, the management server 50 arranges the tunnel connection request 209 on the cloud scan 309 to a position next to the tunnel connection request 206 on the cloud scan 306 (and previous to the tunnel connection request 201 on the cloud scan 301) in the queue (also see FIG. 25).

With this operation, the order of the priority among the two cloud scans 301 and 309 classified into the same category (C11) is determined in accordance with the magnitude of the load adjustment point. Specifically, the order of the priority among the two tunnel connection requests 201 and 209 on the basis of the two communication requests with the data communication from the same device 10a toward the different applications 80b and 80e via the same gateway 30a is determined in accordance with the respective load conditions of the different destination applications 80b and 80e. Then, in accordance with the determined order of the priority, the two tunnel connection requests are performed. More in detail, the tunnel connection request 209 on the application 80e which is in the "non-busy state" is performed in preference to the tunnel connection request 201 on the application 80b which is in the "busy state". In other words, the management server 50 performs the tunnel connection request on the application 80e among the plurality of applications 80, on which the number of already-established tunnel connections is not larger than the threshold value TH3, in preference to the tunnel connection request on the application 80b among the plurality of applications 80, on which the number of already-established tunnel connections is larger than the threshold value TH3. Specifically, the tunnel connection request 209 on the application 80e which is relatively available is performed relatively in preference. Therefore, it is possible to avoid or control the occurrence of waiting time and/or elongation of processing time, which is (are) caused by the execution of the tunnel connection request 201 on the application 80b which is in the busy state. Further, more efficient operation can be achieved as a whole system.

3. Variations

Though the preferred embodiments of the present invention have been described above, the present invention is not limited to the above-described exemplary cases.

For example, though whether the tunnel connection request is based on the user instruction processing or on the management processing depends on the kind of processing of the requested processing (data indicating the kind of processing, or the like) in the above-described preferred embodiments, this is only one exemplary case.

Specifically, the management server 50 may determine whether the tunnel connection request is based on the user instruction processing or on the management processing, on the basis of a communication protocol used for the data transfer relevant to each communication request. For example, when the actual data communication after issuing the communication request uses a communication protocol (e.g., UDP (User Datagram Protocol)) which gives priority to the communication speed (real-time capability) and does not ensure the data integrity, it may be determined that the tunnel connection request corresponding to the communication request is a tunnel connection request on the basis of the management processing. Conversely, when the actual data communication after issuing the communication request uses a communication protocol (e.g., TCP (Transmission Control Protocol)) which gives more weight to the data integrity, it may be determined that the tunnel connection request corresponding to the communication request is a tunnel connection request on the basis of the non-management processing. Further, the management server 50 stores in advance a data table indicating the correspondence between each communication request and the communication protocol which is used in the actual data communication in accordance with the communication request into the storage part 55 thereof. Then, the management server 50 may determine (acquire) the communication protocol in accordance with each communication request (the communication protocol (UDP/TCP or the like) used in the actual data communication in accordance with each communication request), on the basis of the data table.

Alternatively, the management server 50 may determine whether the tunnel connection request corresponding to a communication request is based on the user instruction processing or on the management processing, on the basis of the kind of user requesting the communication request. More in detail, when the requesting user is an administrator (administrative user), it may be determined that the tunnel connection request corresponding to the communication request is a tunnel connection request on the basis of the management processing. Conversely, when the requesting user is a mere user (general user) (non-administrator), it may be determined that the tunnel connection request corresponding to the communication request is a tunnel connection request on the basis of the user instruction processing.

Further, in a case where the communication request is regularly issued (in a certain cycle), it may be determined that the tunnel connection request corresponding to the communication request is a tunnel connection request on the basis of the management processing. For example, the same kind of communication requests which are received repeatedly a predetermined times or more in total at the same time every day may be determined to be based on the "management processing".

Furthermore, though the plurality of communication requests (and the plurality of tunnel connection requests on the basis of the plurality of communication requests) are broadly classified into four categories by using the two classification criteria in the above-described preferred embodiments (see FIG. 7 and the like), this is only one exemplary case. For example, by using only one of the two classification criteria (specifically, by using only the criterion of whether the communication request is the "device trigger communication request" or not), the plurality of communication requests (and the plurality of tunnel connection requests on the basis of the plurality of communication requests) may be broadly classified into two categories.

Further, though one application 80 is provided in each cloud server 70 in the above-described preferred embodiments, this is only one exemplary case. A plurality of applications 80 may be provided in a single cloud server 70.

Furthermore, though one application 80 has a single function in the above-described preferred embodiments, this is only one exemplary case, and one application 80 may have a plurality of functions (e.g., a cloud scan function and a cloud print function). In other words, each application 80 may perform a plurality of kinds of processings.

Further, though the plurality of devices 10, the plurality of gateways 30, and the plurality of cloud servers 70 (applications 80) are provided in the communication system 1 of the above-described preferred embodiments, this is only one exemplary case. Specifically, at least one kind of apparatus among these apparatuses and the like 10, 30, and 70 (80) may be a single apparatus. For example, in the communication system 1, a plurality of devices 10, a single gateway 30, and a plurality of applications 80 may be provided. Alternatively, a single device 10, a single gateway 30, and a plurality of applications 80 may be provided. More alternatively, a single device 10, a single gateway 30, and a single application 80 may be provided.

While the invention has been shown and described in detail, the foregoing description is in all aspects illustrative and not restrictive. It is therefore understood that numerous modifications and variations can be devised without departing from the scope of the invention.

What is claimed is:

1. A communication system comprising:
   a device provided inside a fire wall;
   a cloud server provided outside said fire wall;
   a gateway for relaying communication between the device and an application performed by the cloud server; and
   a management server for managing communication between the device and the application via the gateway,
   wherein said management server has comprises:
      a receiving part for receiving a plurality of communication requests including a first communication request and a second communication request, said first communication request being a communication request from the device, which is a request for communication with data transfer from a side of the device toward a side of the application, and said second communication request being a communication request from the application, which is a request for communication with data transfer from the side of the application toward the side of the device; and
      a tunnel connection request control part for controlling an order of execution of a plurality of tunnel connection requests which are based on said plurality of communication requests,
      wherein each of said plurality of tunnel connection requests is a command requesting the gateway to perform communication using tunnel connection between the gateway and the application, and
      wherein said tunnel connection request control part controls the order of execution such that a first tunnel connection request which is a tunnel connection request based on said first communication request is performed in preference to a second tunnel connection request which is a tunnel connection request based on said second communication request.

2. The communication system according to claim 1, wherein said tunnel connection request control part controls the order of execution such that a third tunnel connection request is performed in preference to a fourth tunnel connection request, said third tunnel connection request being a tunnel connection request based on a third communication request to perform a user instruction processing in accordance with an instruction from a non-administrative user, and said fourth tunnel connection request being a tunnel connection request based on a fourth communication request to perform a management processing not premised on any instruction from said non-administrative user.

3. The communication system according to claim 2, wherein said tunnel connection request control part controls the order of execution such that a tunnel connection request which is said first tunnel connection request and is also said third tunnel connection request, another tunnel connection request which is said first tunnel connection request and is also said fourth tunnel connection request, still another tunnel connection request which is said second tunnel connection request and is also said third tunnel connection request, and yet another tunnel connection request which is said second tunnel connection request and is also said fourth tunnel connection request, are given priority in this order.

4. The communication system according to claim 1, wherein:
the communication system comprises a plurality of devices provided inside the firewall, and
said tunnel connection request control part controls the order of execution such that a tunnel connection request on a first device among said plurality of devices, which has not yet established a larger number of tunnel connections than a first threshold value, is performed in preference to another tunnel connection request on a second device among said plurality of devices, which has already established a larger number of tunnel connections than said first threshold value.

5. The communication system according to claim 1, wherein:
the communication system comprises a plurality of gateways, and
said tunnel connection request control part controls the order of execution such that a tunnel connection request on a first gateway among said plurality of gateways, which has not yet established a larger number of tunnel connections than a second threshold value, is performed in preference to another tunnel connection request on a second gateway among said plurality of gateways, which has already established a larger number of tunnel connections than said second threshold value.

6. The communication system according to claim 1, wherein:
a plurality of applications are performed by one or more cloud servers, and
said tunnel connection request control part controls the order of execution such that a tunnel connection request on a first application among said plurality of applications, which has not yet established a larger number of tunnel connections than a third threshold value, is performed in preference to another tunnel connection request on a second application among said plurality of applications, which has already established a larger number of tunnel connections than said third threshold value.

7. The communication system according to claim 1, wherein said tunnel connection request control part calculates respective evaluation values for said plurality of tunnel connection requests corresponding to said plurality of communication requests received by said receiving part and determines respective priorities for said plurality of tunnel connection requests on the basis of said respective evaluation values.

8. The communication system according to claim 2, wherein:

each of said third communication request and said fourth communication request is a request for communication with data communication between the device and the application, and
said tunnel connection request control part determines whether a tunnel connection request based on a communication request received by said receiving part is said third tunnel connection request or said fourth tunnel connection request, on the basis of a communication protocol used in actual data communication in accordance with each of said plurality of communication requests.

9. The communication system according to claim 8, wherein said tunnel connection request control part determines said communication protocol used in said actual data communication in accordance with said each of said plurality of communication requests, on the basis of a data table indicating a correspondence between said each of said plurality of communication requests and a communication protocol used in said data communication in accordance with said each of said plurality of communication requests.

10. The communication system according to claim 2, wherein said tunnel connection request control part determines whether a tunnel connection request based on a communication request received by said receiving part is said third tunnel connection request or said fourth tunnel connection request, in accordance with whether a requesting user of said communication request is a non-administrative user or an administrative user.

11. A management server which manages communication between a device provided inside a fire wall and an application performed by a cloud server provided outside said fire wall, said communication being relayed by a gateway, the management server comprising:
a receiving part for receiving a plurality of communication requests including a first communication request and a second communication request, said first communication request being a communication request from the device, which is a request for communication with data transfer from a side of the device toward a side of the application, and said second communication request being a communication request from the application, which is a request for communication with data transfer from the side of the application toward the side of the device; and
a tunnel connection request control part for controlling an order of execution of a plurality of tunnel connection requests which are based on said plurality of communication requests,
wherein each of said plurality of tunnel connection requests is a command requesting the gateway to perform communication using tunnel connection between the gateway and the application, and
wherein said tunnel connection request control part controls the order of execution such that a first tunnel connection request which is a tunnel connection request based on said first communication request is performed in preference to a second tunnel connection request which is a tunnel connection request based on said second communication request.

12. The management server according to claim 11, wherein said tunnel connection request control part controls the order of execution such that a third tunnel connection request is performed in preference to a fourth tunnel connection request, said third tunnel connection request being a tunnel connection request based on a third communication request to perform a user instruction processing in accordance with an instruction from a non-administrative user, and said fourth tunnel connection request being a tunnel connection request based on a fourth communication request to perform a management processing not premised on any instruction from said non-administrative user.

13. The management server according to claim 12, wherein said tunnel connection request control part controls the order of execution such that a tunnel connection request which is said first tunnel connection request and is also said third tunnel connection request, another tunnel connection request which is said first tunnel connection request and is also said fourth tunnel connection request, still another tunnel connection request which is said second tunnel connection request and is also said third tunnel connection request, and yet another tunnel connection request which is said second tunnel connection request and is also said fourth tunnel connection request, are given priority in this order.

14. The management server according to claim 11, wherein said tunnel connection request control part controls the order of execution such that a tunnel connection request on a first device among a plurality of devices provided inside said fire wall, which has not yet established a larger number of tunnel connections than a first threshold value, is performed in preference to another tunnel connection request on a second device among said plurality of devices, which has already established a larger number of tunnel connections than said first threshold value.

15. The management server according to claim 11, wherein said tunnel connection request control part controls the order of execution such that a tunnel connection request on a first gateway among a plurality of gateways which relay communication between the device and the application, which has not yet established a larger number of tunnel connections than a second threshold value, is performed in preference to another tunnel connection request on a second gateway among said plurality of gateways, which has already established a larger number of tunnel connections than said second threshold value.

16. The management server according to claim 11, wherein said tunnel connection request control part controls the order of execution such that a tunnel connection request on a first application among a plurality of applications provided outside said fire wall, which has not yet established a larger number of tunnel connections than a third threshold value, is performed in preference to another tunnel connection request on a second application among said plurality of applications, which has already established a larger number of tunnel connections than said third threshold value.

17. The management server according to claim 11, wherein said tunnel connection request control part calculates respective evaluation values for said plurality of tunnel connection requests corresponding to said plurality of communication requests received by said receiving part and determines respective priorities for said plurality of tunnel connection requests on the basis of said respective evaluation values.

18. The management server according to claim 12, wherein:
each of said third communication request and said fourth communication request is a request for communication with data communication between the device and the application, and
said tunnel connection request control part determines whether a tunnel connection request based on a communication request received by said receiving part is said third tunnel connection request or said fourth tunnel connection request, on the basis of a communication protocol used in actual data communication in accordance with each of said communication requests.

19. The management server according to claim 18, wherein said tunnel connection request control part determines said communication protocol used in said actual data communication in accordance with said each of said plurality of communication requests, on the basis of a data table indicating a correspondence between said each of said plurality of communication requests and a communication protocol used in said data communication in accordance with said each of said plurality of communication requests.

20. The management server according to claim 12, wherein said tunnel connection request control part determines whether a tunnel connection request based on a communication request received by said receiving part is said third tunnel connection request or said fourth tunnel connection request, in accordance with whether a requesting user of said communication request is a non-administrative user or an administrative user.

21. A non-transitory computer-readable recording medium having recorded thereon a program to be executed by a computer in a management server for managing communication between a device provided inside a fire wall and an application performed by a cloud server provided outside said fire wall, said communication being relayed by a gateway, the program being executable to cause said computer to perform operations comprising:
receiving a plurality of communication requests including a first communication request and a second communication request, said first communication request being a communication request from the device, which is a request for communication with data transfer from a side of the device toward a side of the application, and said second communication request being a communication request from the application, which is a request for communication with data transfer from the side of the application toward the side of the device; and
controlling an order of execution of a plurality of tunnel connection requests which are based on said plurality of communication requests,
wherein each of said plurality of tunnel connection requests is a command requesting the gateway to perform communication using tunnel connection between the gateway and the application, and
wherein controlling the order of execution comprises controlling the order of execution such that a first tunnel connection request which is a tunnel connection request based on said first communication request is performed in preference to a second tunnel connection request which is a tunnel connection request based on said second communication request.

* * * * *